United States Patent
Lung et al.

(10) Patent No.: US 12,206,826 B2
(45) Date of Patent: Jan. 21, 2025

(54) INTERFACE DEVICE FOR INTERCOM ACCESS CONTROL SYSTEMS

(71) Applicant: Amazon Technologies, Inc., Seattle, WA (US)

(72) Inventors: Aaron Lung, San Jose, CA (US); Kaushik Mani, Sunnyvale, CA (US); Guiqing He, Burien, WA (US); Anubhav Khanna, Seattle, WA (US); Ram Nikhil Dodda, San Francisco, CA (US); Taru Roy, Mountain View, CA (US); Ruslan Khanbikov, San Jose, CA (US); Jin Li, Sammamish, WA (US); Martino Fossarello, Milan (IT)

(73) Assignee: Amazon Technologies, Inc., Seattle, WA (US)

( * ) Notice: Subject to any disclaimer, the term of this patent is extended or adjusted under 35 U.S.C. 154(b) by 219 days.

(21) Appl. No.: 17/949,860

(22) Filed: Sep. 21, 2022

(65) Prior Publication Data

US 2024/0098187 A1   Mar. 21, 2024

Related U.S. Application Data

(60) Provisional application No. 63/403,265, filed on Sep. 1, 2022.

(51) Int. Cl.
*H04M 9/00* (2006.01)
*H04M 9/04* (2006.01)

(52) U.S. Cl.
CPC ............. *H04M 9/007* (2013.01); *H04M 9/04* (2013.01)

(58) Field of Classification Search
CPC ................................ H04M 9/007; H04M 9/04
(Continued)

(56) References Cited

U.S. PATENT DOCUMENTS 7,193,644 B2   3/2007   Carter
8,139,098 B2   3/2012   Carter
(Continued)

FOREIGN PATENT DOCUMENTS

EP             367652 A        5/1990

OTHER PUBLICATIONS

The PCT Search Report and Written Opinion mailed Feb. 5, 2024 for PCT Application No. PCT/US2023/073218 from PCT Summary, 32 pages.
(Continued)

*Primary Examiner* — Binh Kien Tieu
(74) *Attorney, Agent, or Firm* — Eversheds Sutherland (US) LLP

(57) ABSTRACT

This disclosure describes an electronic device that can be installed within an access control system in parallel with a legacy interface device. The electronic device may perform steps of determining a set of configuration settings associated with an access control system to which the electronic device is electrically connected, receiving, by the electronic device, a first signal in a format associated with the access control system, configuring, based on the set of configuration settings, one or more signal pathways within the electronic device, generating, by routing the first signal through the one or more signal pathways, a second signal in a second format, and providing the second signal to at least one second electronic device.

25 Claims, 13 Drawing Sheets

(58) Field of Classification Search
USPC .......................................................... 379/165
See application file for complete search history.

(56) References Cited

U.S. PATENT DOCUMENTS

| | | |
|---|---|---|
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,609,344 B1 | 3/2020 | Tso |
| 2008/0297339 A1 | 12/2008 | Mathews |
| 2010/0316237 A1* | 12/2010 | Elberbaum .......... H04M 11/025 381/300 |
| 2017/0193763 A1* | 7/2017 | Wei ....................... H02M 5/257 |
| 2019/0387104 A1* | 12/2019 | Yssa ................... G07C 9/00309 |

OTHER PUBLICATIONS

PCT Invitation to Pay Additional Fee mailed Dec. 13, 2023 for PCT Application No. PCT/US2023/073218, 26 pages.

* cited by examiner

INTERFACE DEVICE FOR INTERCOM ACCESS CONTROL SYSTEMS

PRIORITY

This application is claims priority to U.S. Provisional Patent Application No. 63/403,265, filed Sep. 1, 2022, titled "INTERFACE DEVICE FOR INTERCOM ACCESS CONTROL SYSTEMS," the entirety of which is incorporated herein by reference.

BACKGROUND

Many apartment buildings utilize wired intercom access control systems for controlling access to a main entryway door. Such access control systems may have an intercom unit that is located at a front entry way of the building and intercom devices (sometimes with a handset) located in individual apartment units. A guest can use the intercom unit at the front entry way to select an apartment unit or resident to contact and the resident is notified (e.g., by the intercom device in the resident's apartment emitting an audible sound). The resident can then use the intercom device/handset in his or her apartment to speak to the guest at the front door. The resident can also use the intercom device/handset to unlock the front door for the guest.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
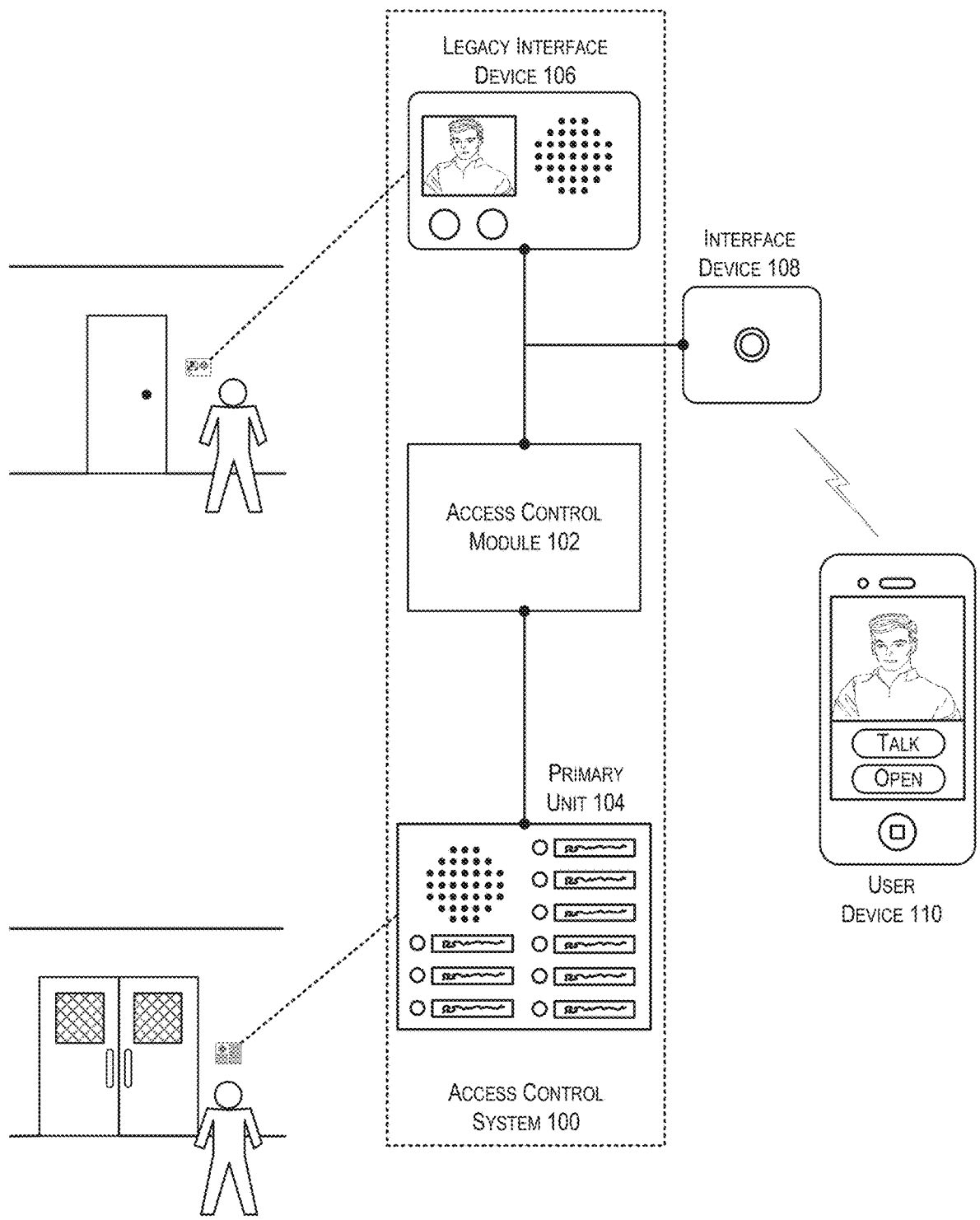
FIG. 1 illustrates an example environment in which an interface device is installed within an access control system in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

This disclosure describes, in part, an interface device that, when used along with a legacy access control system, can address problems posed by, and facilitate new functionality for, that access control system. The interface device can be used with most, if not all, access control systems (e.g., intercom systems) already on the market, regardless of the type of access controls used by such systems.

Legacy intercom access control systems can suffer from a number of problems. For example, residents conventionally need to be physically present in the apartment or unit where an intercom device is installed in order to speak with visitors and to grant them access to the building. Residents also typically still need to carry a key or fob to open any door controlled by the legacy access control system. Additionally, granting access to temporary guests is difficult as it requires the sharing of physical keys or fobs, which has costs (e.g., to make spare keys) and can also result in future security risks (e.g., if the key is lost or the guest fails to return it). However, despite the problems posed by these legacy access control systems, replacing or updating such systems is often prohibitively expensive.

Embodiments described herein are directed to an electronic device representing a retrofit solution that is connected to an existing intercom access control system. The electronic device is also capable of communication with one or more remote servers, and enables a resident to utilize the intercom access control system through a software application installed on his or her mobile device. The electronic device may be installed near the existing access control device and may be connected to it through wires. In use, the electronic device provides the resident with keyless entry and enables talking to, and opening doors for, visitors from a mobile device (e.g., a smartphone) operated by the resident, wherever the resident may be. It is compatible with many different intercom access control systems on the market, including digital and analog, full duplex and half duplex. Installation of the electronic device allows the resident to upgrade existing access control system functionality without having to wait for a building owner to upgrade the entire access control system building-wide.

In accordance with one or more preferred implementations, an electronic device is installed in connection with an intercom access control system used to provide access to a secure area (e.g., an apartment building). The electronic device is preferably installed by being wired in parallel to a legacy intercom device of the access control system, e.g., an intercom handset in a user's apartment or other unit/residence. Although not preferred, in accordance with one or more implementations, an electronic device may be wired in series with a legacy intercom device.

Typically, one or more wires representing lines of an intercom access control system are connected to an intercom device. In accordance with one or more preferred implementations, these lines are wired in parallel to an electronic device in accordance with one or more embodiments disclosed herein. For example, one or more wires representing lines of an intercom access control system may be electrically connected to input lines, ports, or connectors of an intercom device and/or to input lines, ports, or connectors of the electronic device. One or more wires connected to lines, ports, or connectors of an intercom device may be connected to lines, ports, or connectors of the electronic device. One or more wires connected to output lines, ports, or connectors of an intercom device may be connected to input lines, ports, or connectors of the electronic device. One or more wires connected to input lines, ports, or connectors of an intercom device may be connected to output lines, ports, or connectors of the electronic device.

In some cases, one or more wires (e.g., including one or more wires forming or representing a bus) intended to be plugged into (electrically connected to) an intercom device may be plugged into (electrically connected to) the electronic device instead and one or more wires (e.g., including one or more wires forming or representing a bus) may be plugged into the electronic device and the intercom device.

In accordance with one or more preferred implementations, a wiring scheme is utilized in which any signal transmitted over a bus of the access control system will be transmitted to both the handset and the electronic device.

The electronic device may include a digital interface board configured to interface with a digital access control system. When the electronic device is installed by being electrically connected to an access control system, a user indicates (via an app installed on his or her user device), a model of the access control system. Data representing an indication of this model is communicated from the user's device to a remote computing system, and the remote computing system communicates data representing an indication of the model or data representing an indication of one or more configuration settings to the electronic device. Based on data received from the remote computing system indicating a model of an access control system or configuration settings, the electronic device stores an indication of one or more configuration settings or sets one or more configuration settings, e.g. in non-transitory electronically readable memory.

In accordance with one or more preferred implementations, configuration settings associated with the access control system are used to determine one or more lines within the digital interface board to assert (e.g., send a signal along that activates/deactivates), as well as determine a pattern or frequency for doing so. For example, as described in more detail hereinbelow, a particular line may be asserted in a particular pattern to cause a shunt to shunt a power data bus line to a common bus line, effecting signaling over a bus of an intercom access control system.

The interface device may send the processed signal to a remote system, where the signal is then forwarded to a user device. This allows a visitor of a secure area to communicate directly with a user (e.g., a resident or other authorized person) using audio or video wherever that user happens to be. Additionally, the user is able to provide the visitor with access to the secure area remotely via his or her user device. Even when no visitor is present, the user is able to use his or her user device to unlock the secure area in order to gain access without needing to carry a key or fob.

FIG. 1 illustrates an example environment in which an interface device is installed within an access control system 100 in accordance with at least some embodiments. In an access control system, an access control module 102 may be configured to control access to a building or other secure area. The access control module 102 may be made up of any suitable combination of hardware and/or software capable of routing communications between a primary unit 104 and one or more legacy interface device 106. In some embodiments, the access control module 102 is part of, or at least collocated with, the primary unit 104. Where the access control module 102 is separate from the primary unit, the access control module 102 may be in communication with the primary unit 104 via an access control system bus, or via a power data bus or other bus of the access control system.

The access control module 102 may be configured to receive input from a guest or other visitor via a primary unit 104. The primary unit may be any device that is capable of being physically interacted with by a user. The input received at the primary unit may include an indication of a resident or user to be contacted (e.g., an apartment or unit number). Upon receiving the input, the access control module 102 may be configured to provide a notification to the resident to be contacted. For example, the access control module 102 may provide a signal directed toward a legacy interface device 106 that causes it to emit an audio and/or visual signal.

Upon receiving a response to the signal, the access control module 102 may establish communication between the primary unit 104 and the legacy interface device 106. In some embodiments, such communication may include data representing audio that is captured by microphones of the primary unit 104 and the legacy interface device 106. Speakers of the primary unit 104 and the legacy interface device 106 may generate sound based on this data. In some embodiments, such communication may further include video data that is generated by a camera installed on the primary unit 104 and relayed to the legacy interface device 106, on which the video may be presented (e.g., on a display).

An interface device 108 may be installed in parallel to the legacy interface device 106, such that a signal directed to the legacy interface device 106 by the access control module 102 may also be received at the interface device 108. The interface device 108 may be configured to, upon receiving a signal from the access control module 102, translate that signal into a format that can be used by an audio/video player executed on a separate electronic device (e.g., user device 110). That signal is then provided by the interface device 108 to a user device 110 operated by a user. In some embodiments, the user device may be a smartphone or other mobile device.

In order to provide the translated signal to a user device 110, the interface device 108 may transmit the translated signal to a remote system (e.g., a cloud service) to be relayed to the user device 110. In some cases, the signal is relayed by the interface device 108 to a remote system via a communication session established over a private network and then routed by the remote system to a user device via a communication session established over a telecommunication network.

In embodiments in which the remote system uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
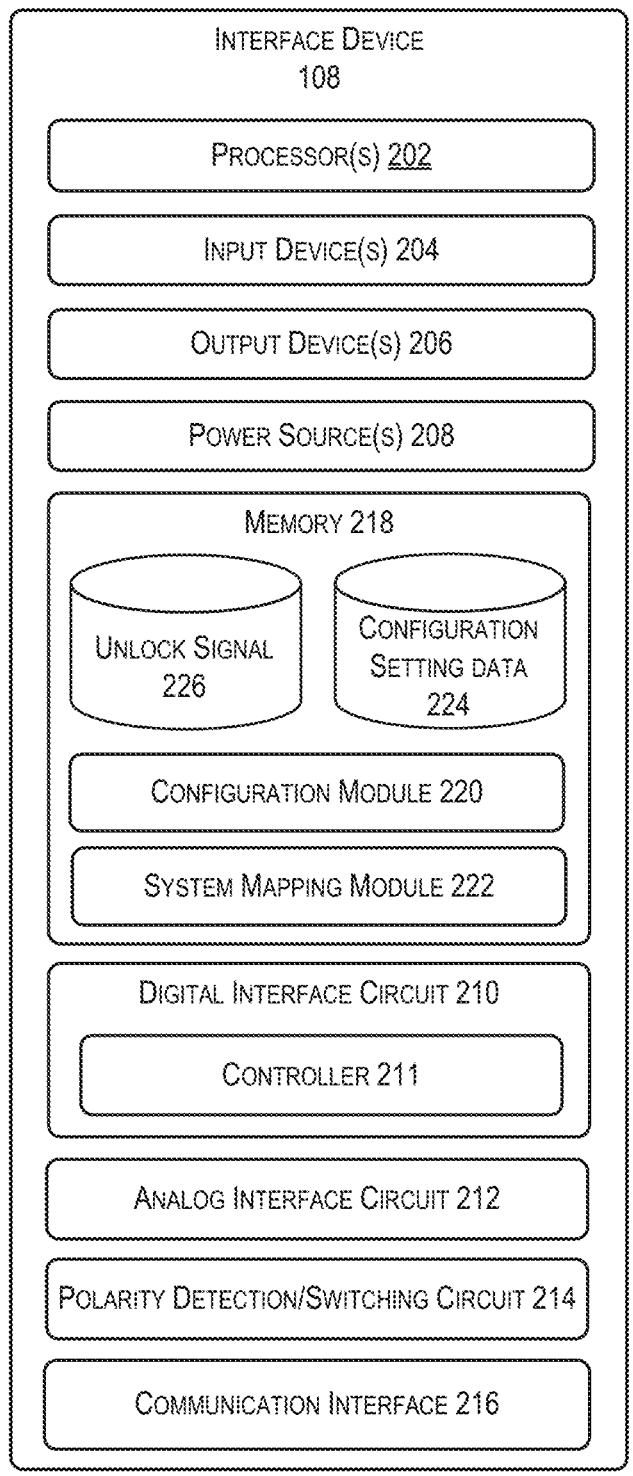
FIG. 2 depicts an example architecture of an interface device in accordance with at least some embodiments.

FIG. 2 depicts an example architecture of an interface device 108 in accordance with at least some embodiments. As shown in FIG. 2, an interface device 108 may include a number of hardware components, such as one or more processors 202, one or more input devices 204, one or more output devices 206, one or more power sources 208, a digital interface board 210, an analog interface board 212, a polarity detection/switching circuit 214, a communication interface 216, and a memory 218.

As used herein, a processor 202 may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

An input device 204 may be any component configured to enable a user to provide input to the interface device. An input device 204 may include, but is not limited to, a button, a touch-sensitive surface, a switch, a slider, and/or any other type of device that allows a user to provide input to the interface device 108. In some embodiments, the input device may allow a user of the interface device 108 to indicate a type or model of access control system to which the interface device is to be connected.

The output devices 206 may be any component capable of providing an output signal to a user. In some cases, an output device 206 may comprise one or more lights that are powered up to provide an output signal to a user. In some cases, an output device 206 may be a speaker capable of producing sound in response to an electrical signal input.

The power source(s) 208 may include one or more batteries that provide power to the interface device 108. However, in other examples, the interface device 108 may not include the power source 208. In such examples, the interface device 108 may be powered using a source of external AC (alternating-current) power, such as a household AC power supply (alternatively referred to herein as "AC mains" or "wall power"). The AC power may have a voltage in the range of 112-224 VAC, for example. The incoming AC power may be received by an AC/DC adapter (not shown), which may convert the incoming AC power to DC (direct-current) and may step down the voltage from 112-224 VAC to a lower output voltage of about 12 V DC and an output current of about 2 A, for example. In various embodiments, the output of the AC/DC adapter is in a range from about 3 V to about 15 V and in a range from about 0.5 A to about 5 A. These voltages and currents are examples provided for illustration and are not intended to be limiting.

In some embodiments, in addition to (or alternatively to) having a power source 208, the interface device 108 may draw at least some amount of power from the access control system. For example, when the interface device is used with an analog access control system, the interface device may siphon a portion of the access control system's "doorstrike" power (e.g., power used to signal a legacy interface device) to extend a battery life. In another example, when the interface device is used with a digital access control system, the interface device may siphon a portion of the access control system's bus power to extend battery life.

The digital interface board 210 is configurable to process signals received from a multitude of different digital access control systems. It should be noted that a number of different models of access control system are available on the market, each of which may operate using protocols that are proprietary to the respective access control system as well as varying power/voltage levels. The digital interface board 210 may include a number of electronic components that can be activated, deactivated, or otherwise adjusted based on configuration settings for a particular access control system. The digital interface board 210 may further be configured to generate a demodulated data signal to be provided to a user device. The digital interface board 210 may include a controller 211 configured to effect the sending of signals over one or more input lines to assert those input lines in order to control operation of the digital interface board. In some embodiments, such a controller 211 may include firmware or other executable instructions that provide logic for controlling operation of the digital interface board.

In some conventional access control systems that use digital signaling, two wires are used for a signaling bus: one positive line with a positive polarity DC current (that can be characterized as a power data bus line), and one common or ground line that is sometimes characterized as a negative line. In some systems, a third wire may be used to convey power. In some conventional access control systems that use digital signaling, a two-wire signaling bus might instead include a negative line with a negative polarity DC current (that can be characterized as a power data bus line), and one common or ground line that is sometimes characterized as a positive line.

In digital systems, various input and output data may be encoded into a single signal that is transmitted over the same wire. Often, the data may be encoded using a scheme that is proprietary to the access control system. Accordingly, the digital interface board 210 may be configured to isolate and identify particular data from the single signal so that it may be useable by a downstream system.

The analog interface board 212 may be a hardware component that is configurable to process signals received from a multitude of different analog access control systems. In embodiments, each wire attached to the analog interface board 212 may correspond to separate inputs/outputs of the access control system. For example, separate wires may correspond to an unlock signal, audio in, audio out, doorbell ring, and one or more ground wires. In some cases, audio in and audio out may be isolated via one or more relays. In other cases, audio in and audio out may share a single wire.

Although described herein as a digital interface board and an analog interface board, these boards and circuitry, elements, and components of these boards may be combined into a single board, or combined with another board, etc.

The polarity detection/switching circuitry 214 may be a hardware component that is configurable to automatically detect a polarity of wires connecting the interface device to an access control system and to, in some cases, reroute electrical pathways such that the polarity of wires connecting to other circuitry of the interface device is caused to be static. The polarity detection/switching circuitry is described in greater detail with respect to FIG. 7 below.

The communication interface 216 may be any component configured to enable data to be communicated between electronic devices. The communication interface 216 may include one or more network interface controllers (NICs) or other types of transceiver devices to send and receive messages over network(s). For instance, the communication interface 216 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (Wi-Fi), or any other PAN message protocol. Furthermore, the communication interface 216 may include a wide area network (WAN) component to enable message over a wide area network.

The communication interface 216 may further include a physical connection for connecting the access control system to the interface device, and particularly to the digital interface board 210. In some cases, the communication interface 216 may include a connector having a number of pins (or other connections) that may be used (or remain unused) during communication with an access control system. For example, the connector may be a 12-pin external connector for which, during communication with an access control system, a signal is communicated over only a subset of the 12 pins associated with the access control system.

In some embodiments, the physical connection may include a component for providing automatic bus polarity detection and switching. It should be noted that, along with proprietary protocols, a polarity of a bus system used to connect the access control module to a legacy interface device may vary by model. Some access control systems may use the same name or color scheme for two bus wires and users are unable to tell which wire is positive, and which wire is ground. Accordingly, the physical connection may further include a circuit which is able to provide a means to tell which wire is positive and which wire is ground after the interface device has been installed. Such a circuit may further include firmware able to utilize this information to control switches/relays in order to make the correct connection between the two incoming in-polarized wires and the internal two polarized terminals.

Memory 218 may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information, and which can be accessed by the processor(s) 202.

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the communication interface 216, the I/O devices of the respective apparatuses, and so forth, and provide various services to applications or components executing on the processor(s) 202. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (ENEA OSE) as promulgated by ENEA AB of Sweden; and so forth.

Turning to the contents of the memory 218 in more detail, the memory 218 may include an operating system and one or more application programs or services for implementing the features disclosed herein including at least one module for configuring the digital interface board 210 for use with a particular access control system (configuration module 220). In some embodiments, the memory 218 may further include a module for automatically detecting particular configuration settings to be applied (system mapping module 222) to the digital interface board 210. The memory 218 may also include configuration setting data 224 that includes an indication of individual settings to be applied to each of a number of components within the digital interface board 210 as well as unlock signal data 226.

In embodiments that include a configuration module 220, the configuration module 220 may be configured to, in conjunction with the processors 202, apply information included in the configuration setting data 224 to various components of the digital interface board 210. In some embodiments, this may involve updating state data (e.g., an "on" or "off" state) stored in specific components in order to activate or deactivate those components and/or electrical pathways within the digital interface board. In some cases, one or more components may be activated/deactivated in a specified pattern. For example, the configuration module 220 may be configured to assert certain electrical pathways in a pulsing pattern based on data to be transmitted. In some embodiments, particular data values (e.g., threshold data values) may be stored within components of the digital interface board.

In embodiments that include a system mapping module 222, the system mapping module 222 may be configured to, in conjunction with the processors 202, select configuration settings to be stored in the configuration setting data 224. In some embodiments, this may involve receiving a set of configuration settings from a remote system (e.g., based on information about an access control system as indicated by a user). In some embodiments, the interface device 108 may maintain a mapping between particular access control systems and respective configuration settings. In these embodiments, upon identifying a particular access control system in which the interface device is to be installed, the system mapping module 222 may be configured to identify the appropriate set of configuration settings based on the mapping and store that set of configuration settings in the configuration setting data. In some cases, the access control system may be identified based on input provided by a user. In other cases, the access control system may be identified automatically, such as based on information included in, or a format of, a signal received from the access control system.

The memory may further store an unlock signal 226 that can be provided to the access control system in order to cause it to unlock a door or otherwise grant access to a secure area. In some cases, the unlock signal may be obtained from a legacy interface device (e.g., legacy interface device 106 as depicted in FIG. 1) upon detecting an unlock event. The obtained unlock signal is stored in memory 218 and may be replayed to the access control system upon the interface device receiving instructions to grant access to the secure area.

Figure 3:
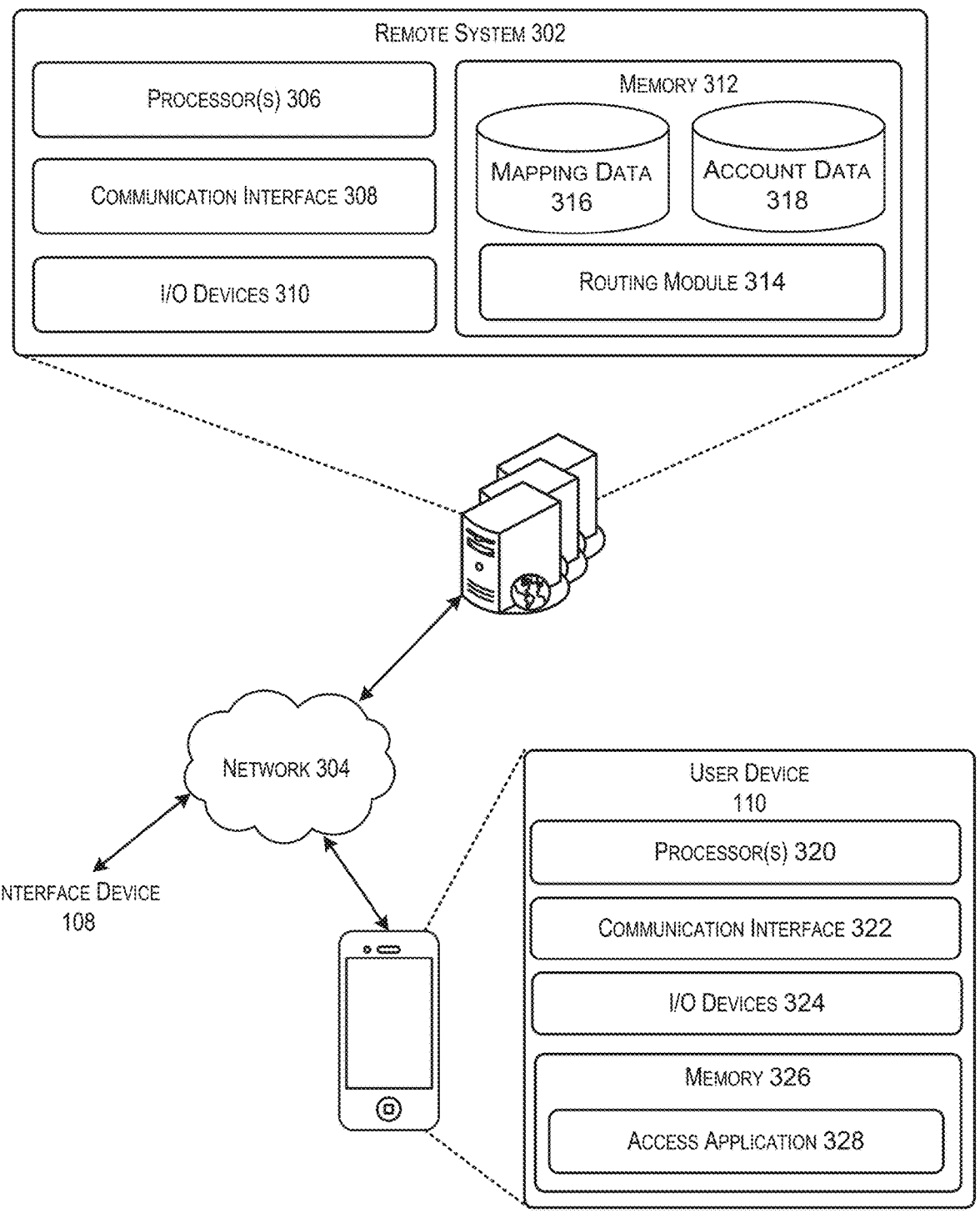
FIG. 3 depicts an example architecture of an environment that includes a remote system and a user device in accordance with at least some embodiments.

FIG. 3 depicts an example architecture of an environment that includes a remote system 302 and a user device 110 in accordance with at least some embodiments. As shown in FIG. 3, a remote system 302 may be in communication with a user device 110 via a network connection 304.

The remote system 302 may include one or more host computing devices that may be used to implement the functionality described herein according to some implementations. The remote system 302 may be hosted on one or more servers or other types of computing devices that may be embodied in any number of ways. For instance, in the case of a server, the remote system 302 may be implemented on a single server, a cluster of servers, a server farm or data center, a cloud hosted computing service, and so forth, although other computer architectures (e.g., a mainframe architecture) may also be used. Further, while the figures illustrate the components of the remote system 302 as being present in a single location, it is to be appreciated that these components may be distributed across different computing devices and locations in any manner. Generally, the remote system 302 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise or may be provided by the servers and/or services of multiple entities or enterprises.

The remote system 302 may include a number of hardware components, such as one or more processors 306, a communication interface 308, one or more input/output (I/O) devices 310, and a memory 312.

The communication interface(s) 308 may include one or more interfaces and hardware components for enabling communication with various other devices, such as the user device 110 or an interface device 108, over the network 304. For example, communication interface(s) 308 may facilitate communication through one or more of the Internet, cable networks, cellular networks, wireless networks (e.g., Wi-Fi, cellular) and wired networks. Various different approaches to implementations described herein can be implemented in various environments. For instance, the network 304 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

As depicted, remote system 302 may further be equipped with various input/output devices 310. Such I/O devices 310 may include a display, various user interface controls (e.g., buttons, mouse, keyboard, touch screen, etc.), audio speakers, connection ports and so forth.

Memory 312 may include volatile and nonvolatile memory, removable and non-removable media implemented in any method or technology for storage of information, such as computer-readable instructions, data structures, program component, or other data. Turning to the contents of the memory 312 in more detail, the memory 312 may include an operating system and one or more application programs or services for implementing the features disclosed herein including at least a module for routing communications between an interface device 108 and a user device 110 (e.g., routing module 314). In some cases, the memory may further include mapping data 316 that includes a number of settings or other configuration data associated with each of a number of different access control systems. In some cases, the memory may further store account data that includes information associating particular interface devices with particular user devices and/or users.

A routing module 314 may be configured to, in conjunction with the processor 306, route communications between an interface device 108 and a user device 110. In some embodiments, the remote system receives a signal from an interface device that indicates a request to contact a user. The interface device that transmitted the signal may be identified based on a serial number or other unique identifier included within the received signal. A lookup may be performed based on that identification in order to identify (e.g., from account data 318) an account associated with the identified interface device. Once an account associated with the interface device has been identified, a user device associated with the account may be determined and the routing module 314 may provide a notification to the user device to provide notification of the request to contact the user. Upon receiving a response to the notification, the routing module may either terminate the request or establish a communication session between the interface device 108 and the user device 110 based on information included in that response.

In some embodiments, the routing module may be configured to convey streaming data between the interface device 108 and the user device 110. In some embodiments, the streaming data may include audio data. For example, audio data collected by a microphone of a primary unit in the access control system may be obtained by the interface device and transmitted to the remote system 302, where the routing module then forwards that audio data to the user device 110 to be presented via a speaker at the user device. Additionally, audio data collected by a microphone of the user device may be transmitted to the remote system 302, where the routing module then forwards that audio data to the interface device to be presented via a speaker at the primary unit. In some embodiments, the streaming data may further include video data. For example, video (or other imagery) data collected by a camera of a primary unit in the access control system may be obtained by the interface device and transmitted to the remote system 302, where the routing module then forwards that video data to the user device 110 to be presented via the display of the user device. In some cases, video data collected by a camera of the user device may also be transmitted to the remote system 302, where the routing module then forwards that video data to the interface device to be presented via a display screen on the primary unit. Additionally, the user device may provide an unlock request to the remote system, which is then forwarded to the interface device. Upon receiving such an unlock request, the interface device 108 may be configured to replay or generate an unlock signal stored in memory to cause the access control system to grant access to a secure area.

The mapping data 316 may include a number of data tables that each indicate particular configuration settings to be applied in a digital interface board when used in relation to a particular access control system model. In some cases, the configuration settings may store an indication of one or more components in the digital interface board that is to be activated or deactivated as well as a frequency or pattern at which the one or more components is to be activated/deactivated in order to send data over a bus. For example, the configuration settings may indicate one or more switches that is to be switched on or off as well as a frequency or pattern for doing so. In some cases, the configuration settings may store an indication of one or more data values to be stored at the digital interface board, such as data to be provided using inter-integrated circuits (FC). In some embodiments, a number of different data tables may be maintained, with each data table being stored in relation to a different model of access control system.

In certain embodiments, the remote system 302 may include a cloud infrastructure system that may provide one or more cloud services using different models such as under a Software as a Service (SaaS) model, a Platform as a Service (PaaS) model, an Infrastructure as a Service (IaaS) model, and others, including hybrid service models. The remote system 302 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by the remote system 302.

An IaaS model is generally used to provide infrastructure resources (e.g., servers, storage, hardware and networking resources) to a customer as a cloud service to provide elastic compute and storage capabilities.

A PaaS model is generally used to provide, as a service, platform and environment resources that enable customers to develop, run, and manage applications and services without the customer having to procure, build, or maintain such resources.

The user device 110 may include any suitable electronic device capable of performing the functions described in relation the user device. The user device 110 may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone 0), tablets (e.g., iPad 0), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The user device 110 may be capable of executing various different applications such as various Internet-related apps, communication applications (e.g., E-mail applications, short message service (SMS) applications) and may use various communication protocols. The user device 110 may include a number of hardware components, such as one or more processors 320, a communication interface 322, one or more input/output (I/O) devices 324, and a memory 326.

The communication interface 322 may include one or more interfaces and hardware components for enabling communication with various other devices, such as the remote system 302, over the network 304. Protocols and components for communicating via such networks are well known and will not be discussed herein in detail.

As depicted, user device 110 may further be equipped with various input/output devices 324. In some cases, the I/O devices 324 may include output devices such as speakers capable of presenting audio to a user and/or a display capable of presenting video or imagery to the user. In some cases, the I/O devices 324 may include input devices such as a microphone capable of capturing audio input from a user and/or a camera capable of capturing image or video input from a user.

Memory 326 may include an operating system and one or more application programs or services for implementing the features disclosed herein, including at least an application for enabling a user to receive and respond to notifications provided by a remote access system as well as to grant access to a secure area remotely (e.g., access application 328).

An access application 328 may be configured to, in conjunction with the processor 320, present notifications received from the remote system to a user of the user device 110. For example, the access application 328 may be configured to present audio received from the remote system to the user via one or more speakers of the I/O devices 324. In another example, the access application 328 may be configured to present video or other images received from the remote system to the user via one or more displays of the I/O devices 324.

Additionally, the access application 328 may be configured to receive input from a user of the user device 110. The access application 328 may be configured to relay the received input to the remote system 302. For example, the access application 328 may be configured to receive audio input from a user of the user device 110 via one or more microphones of the I/O devices 324. In another example, the access application 328 may be configured to receive video or image input from a user of the user device 110 via one or more cameras of the I/O devices 324.

In some embodiments, the access application 328 may be further configured to relay an access grant signal to a primary unit from which the notification originated. For example, the access application may cause a button, or other suitable input mechanism, to be displayed on the display of the user device 110. Upon receiving an indication that the button has been pressed, the application system may generate the access grant signal to cause a door to be unlocked by the access control system.

As previously noted, the interface device includes a digital interface board. In accordance with one or more preferred implementations, the digital interface board comprises circuitry to receive and transmit 2-wire bus digital signaling. In accordance with one or more preferred implementations, the digital interface board includes a 3V general purpose input/output (GPIO) for transmit and receive data (e.g., an uncommitted digital signal pin that may be used for both transmit data and receive data). In accordance with one or more preferred implementations, the digital interface board further includes onboard inter-integrated circuit (FC) GPIO expanders and digital potentiometers supporting tuning and logic level thresholds. In accordance with one or more preferred implementations, the entire interface can be powered down or off to conserve battery power for analog intercom operation.

In accordance with one or more preferred implementations, a digital interface board includes digital interface board receiving (DIBR) circuitry and digital interface board transmitting (DIBT) circuitry. The digital interface board is configured to receive information from an access control system over one or more wires representing a bus, and send data to an access control system over the one or more wires representing a bus.

Figure 4:
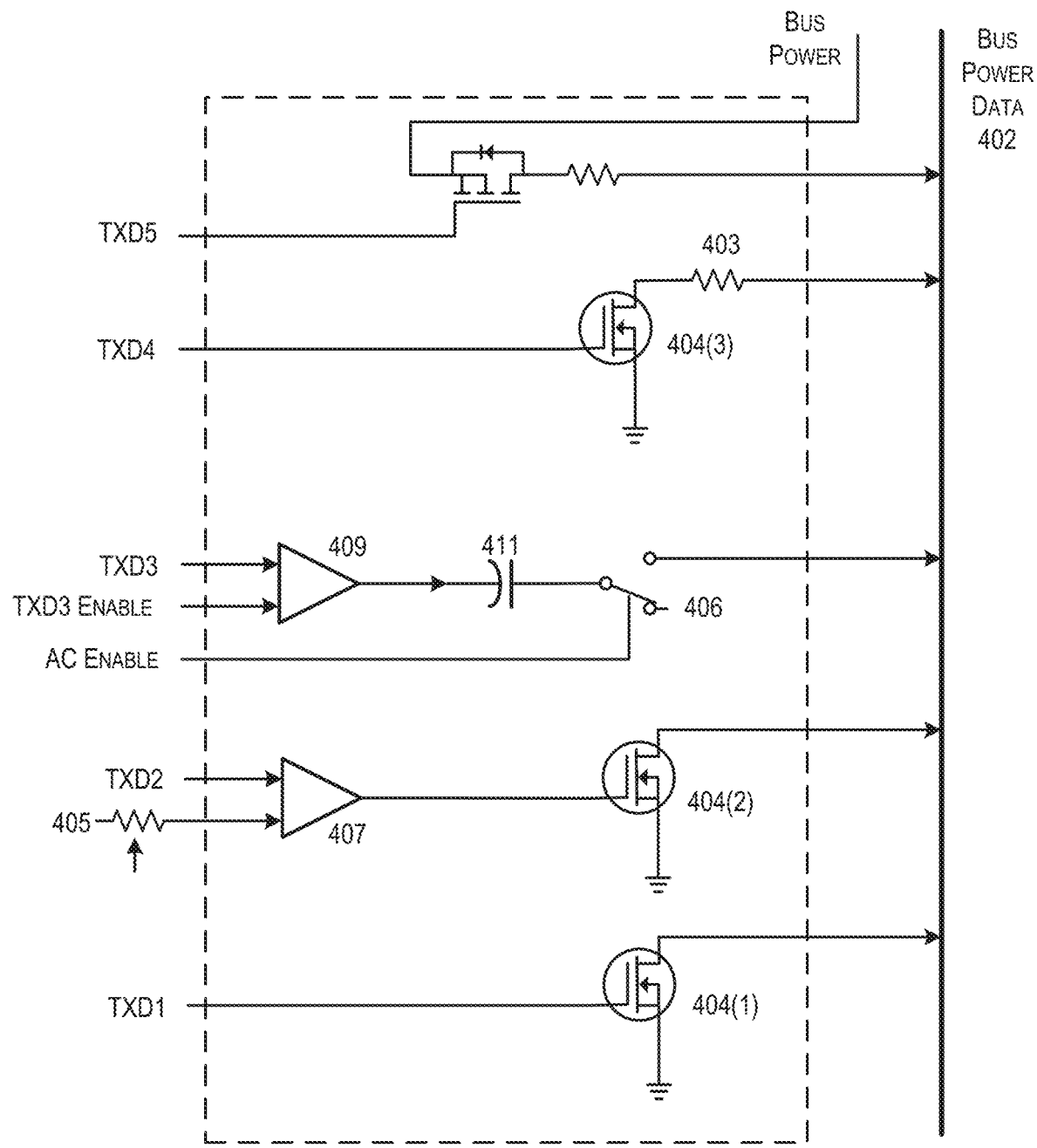
FIG. 4 illustrates an example digital interface board transmitting circuit that may be implemented in accordance with some embodiments.

FIG. 4 illustrates exemplary digital interface board transmitting (DIET) circuitry that may be implemented in accordance with some embodiments. This circuitry may include one or more metal-oxide-semiconductor field-effect transistors (MOSFET) operating as switches based on a control signal from an input line or trace. This circuitry may utilize these MOSFETs to effectively provide a shunt path between two lines (which may be characterized as "closing" a shunt or shunt path), and generate a signal over one of the lines based thereon. This circuitry may be configured to allow the digital interface board to generate an outgoing signal for buses of multiple different access control systems. As previously noted, different access control systems may use various signaling approaches (e.g., use varying voltages, etc.) and schemes. For example, such access control systems may provide signaling between 0 and 60 volts DC.

Generally, a shunt provides a path for a charge carrier or electric current (e.g., a low resistance path that allows electrons or current to pass around another point in a circuit).

In accordance with one or more preferred implementations, a line (e.g., a trace) operating as an input to a transistor (e.g., MOSFET), switch, or shunt circuitry is asserted to shunt, or short, a first line to a second line. Such a switch can be characterized as a shunt switch.

In accordance with one or more preferred implementations, an N-channel depletion mode MOSFET or N-channel enhancement mode MOSFET is utilized as a switch, with an input trace or line connected to a gate terminal of the MOSFET, a ground or common bus connection line connected to the source terminal, and a power data bus connection line connected to the drain terminal. In operation, current or signal supplied over the input trace or line to the gate terminal can be varied to allow or prevent (e.g. by squeezing or pinching off) current flow between the source and drain terminals. It will be appreciated that in implementations utilizing a depletion mode MOSFET, current is generally able to flow between the source and drain terminals at zero gate-source voltage. Conversely, for an enhancement mode MOSFET, current is generally prevented from flowing at zero gate-source voltage. Accordingly, the input signal to be provided over the input line connected to the gate terminal for assertion of the input line to allow current to flow from the source terminal to the drain terminal will vary depending on the type of MOSFET utilized. Although largely described herein with respect to a N-channel MOSFET (associated with flow of charge carriers in the form of electrons), in accordance with one or more preferred implementations, P-channel MOSFETs (associated with flow of holes) may be utilized. In accordance with one or more preferred implementations, a P-channel enhancement mode or P-channel depletion mode MOSFET may be utilized.

For example, consider an exemplary access control system with a first line or wire at a voltage level between 0 and 50 volts DC, and a second line or wire representing a common or ground. In accordance with signaling approaches of many intercom systems, the first line can be characterized as a power data bus line, and the second line can be characterized as a common bus line. In accordance with one or more preferred implementations, the first line or wire representing a power data bus line is electrically connected to a power data bus connection line of a digital interface board (e.g., a power data bus connection trace), and the second line or wire representing a communication bus line is electrically connected to a common bus connection line or ground of the digital interface board. In accordance with one or more preferred implementations, these lines may be routes or traces of a printed circuit board.

In accordance with one or more preferred implementations, the line or trace connected to a gate terminal of an N-channel depletion mode MOSFET is asserted to enable the flow of current between a source terminal (connected to a common bus connection line or ground) and a drain terminal (connected to a power data bus connection line), thus shunting or shorting the power data bus connection line to the common bus connection line or ground (thus effectively shunting or shorting the power data bus line with the common bus line or ground). This causes a detectable voltage change through the power data bus line that another unit monitoring the bus (e.g. a primary unit) can detect.

As a specific example, consider a scenario where a power data bus generally operates at 16 volts DC. An input trace or line connected to a gate terminal of a MOSFET is asserted (e.g., a signal is sent over it) to shunt a power data bus connection line to common or ground and drive the voltage of the power data bus line to 8 volts DC. This voltage dip to 8 volts DC is detectable in a signal over the power data bus line. For example, a primary unit monitoring the bus by repeatedly measuring (at a high rate) a voltage value of the power data bus line will detect this voltage change.

The input line can be repeatedly asserted in a pulsed manner to send a signal representing data over the bus (e.g., for receipt by the primary unit). For example, the input line can be asserted for a time interval (driving the power data bus wire to 8 volts DC), left unasserted for the time interval (causing the power data bus wire to return to 16 volts DC), and then asserted again for the time interval (again driving the power data bus wire to 8 volts DC). The system could utilize a signaling scheme where 16 volts DC indicates a "1" bit value, while 8 volts DC indicates a "0" bit value. In this way, binary data comprising "0" bits and "1" bits can be sent as a signal over the bus.

In accordance with one or more preferred implementations, one or more configuration settings may be used to determine one or more lines to be asserted and logic for asserting such one or more lines to generate a signal for communication over a bus of an access control system a device is connected to. It should be noted that one or more lines may be asserted for a particular access control system. The circuitry controlled by TXD(1-5) each depict different examples of circuitry that may be implemented in order to generate a signal communicated over a bus of an access control system.

One or more preferred implementations may include a collection of components that can be characterized as fixed level shunt switch circuitry, including a switch or other electrical connection that can be controlled based on assertion of the trace or input line TXD1 to control current flow between a first line and a second line.

As noted above, in accordance with one or more preferred implementations, an N-channel MOSFET is utilized as a switch, with an input line connected to a gate terminal of the MOSFET, a ground or common bus connection line connected to the source terminal, and a power data bus connection line connected to the drain terminal. In accordance with one or more preferred implementations, other components may be utilized to effect opening and closing of a shunt, such as another type of MOSFET (e.g., another channel or mode MOSFET), another type of field effect transistor, another type of transistor, a switch, a solid-state relay, etc.

The fixed level shunt switch circuitry may act as a short circuit when it is in a closed state, shorting a first line or trace to a second line or trace. The fixed level shunt switch circuitry preferably shunts a power data bus line to a common bus line.

With reference to a preferred implementation utilizing an N-channel MOSFET, the circuitry communicates data over the bus by shunting the power data bus connection line to the common bus connection line. For example, consider again a scenario where a power data bus line of an intercom system generally operates at 16 volts DC. A signal can be sent through a first input line (e.g., TXD1) to assert the input line and electrically connect the power data bus line to the common bus line or ground, driving the voltage to 8 volts DC. This voltage dip to 8 volts DC is detectable in a signal over the power data bus line. For example, a primary unit monitoring the bus by repeatedly measuring (at a high rate) a voltage value of the power data bus line will detect this voltage change.

The input line can be repeatedly asserted in a pulsed manner to send a signal representing data over the bus (e.g., for receipt by the primary unit). For example, the input line can be asserted for a time interval (driving the power data bus wire to 8 volts DC), left unasserted for the time interval (causing the power data bus wire to return to 16 volts DC), and then asserted again for the time interval (again driving the power data bus wire to 8 volts DC). As noted above, the system could utilize a signaling scheme where 16 volts DC indicates a "1" bit value, while 8 volts DC indicates a "0" bit value. In this way, binary data comprising "0" bits and "1" bits can be sent as a signal over the bus. The precise signaling scheme utilized, e.g., the voltage values corresponding to 1s and 0s and the amount of time to shunt the bus to signal a bit, is determined based on user configured settings indicating a model of intercom system to which the electronic device is connected.

One or more preferred implementations may include a collection of components that can be characterized as variable level shunt switch circuitry comprising a variable level resistor (e.g. a digital potentiometer) and a switch or other electrical connection that can be closed based on assertion of a trace or input line (e.g. TXD2) to control electrical connection of a first line and a second line.

In accordance with one or more preferred implementations, an N-channel MOSFET is utilized as a switch, with an input line connected to a gate terminal of the MOSFET, a ground or common bus connection line connected to the source terminal, and a power data bus connection line connected to the drain terminal. In accordance with one or more preferred implementations, other components may be utilized to effect opening and closing of a shunt, such as another type of MOSFET (e.g., another channel or mode MOSFET), another type of field effect transistor, another type of transistor, a switch, a solid-state relay, etc.

In accordance with one or more preferred implementations, an I²C bus is used to update a digital potentiometer 405 to change a resistance of the digital potentiometer 405 and thus impact a voltage produced by operation of the variable level shunt switch circuitry. In accordance with one or more preferred implementations, such a digital potentiometer 405 has an input power line providing a generally fixed voltage (e.g. 5 volts) connected to an input terminal. In accordance with one or more preferred implementations, a voltage of the input power line is based on a reference provided by a bus line (e.g. a ground or common line). In accordance with one or more preferred implementations, a voltage of the input power line is not based on using a bus line as a reference.

In accordance with one or more preferred implementations, an operational amplifier 407 or comparator is utilized that takes as input an input signal from an input trace or line (e.g. TXD2). The operational amplifier 407 or comparator also takes as input an output signal from the digital potentiometer. The operational amplifier 407 or comparator provides as output an adjusted signal that is then provided as input to a MOSFET at a gate terminal. In accordance with one or more preferred implementations, adjustment of the input signal for setting a value of the digital potentiometer changes the adjusted signal that is provided as input to the MOSFET at the gate terminal, which in turn impacts current flow through the MOSFET and an output signal at the drain terminal. In this way, second input provided to the operational amplifier 407 or comparator from the digital potentiometer 405 causes first input (e.g. TXD2) to the operational amplifier 407 or comparator to turn on or off a variable level voltage (based on a resistance value of the digital potentiometer) to the gate terminal of the MOSFET. This, in turn, varies the impact on current flow through the MOSFET, which allows the system to short or shunt a power data bus connection line to a common bus connection line or ground with a variable level.

In accordance with one or more preferred implementations, one or more lines may be inverted, e.g. TXD1, TXD2, etc. may be inverted to accommodate use of a depletion mode MOSFET.

In accordance with one or more preferred implementations, a digital potentiometer may be utilized in a circuit in another manner or at another location, e.g. along a trace connecting output from a MOSFET to a power data bus connection line.

Variable level shunt switch circuitry may be used to shunt a power data bus connection line to a common bus connection line or ground. With reference to a preferred implementation utilizing an N-channel MOSFET, the circuitry Variable voltage shunt may be used to drive a ramp in steps of voltage (e.g., drive a ramp in steps of 0.8V from 4V20V→4V on a 24V bus with 1K source series resistance). In accordance with one or more preferred implementations, a rate of change is dictated by the I2C bus speed and updates of the digital potentiometer.

For example, consider a scenario where a power data bus generally operates at 24 volts DC. A signal is sent through an input line to adjust a resistance of a digital potentiometer associated with variable level shunt switch circuitry. Thereafter, a signal can be sent through another input line (e.g., TXD2) to assert the another input line and electrically connect the power data bus line to the common bus line, driving the voltage to a lower voltage value based on the set resistance value of the digital potentiometer. For example, the resistance of the digital potentiometer might be set to cause a drop in voltage to 4 volts DC.

Subsequently, a signal is again sent through an input line to adjust the resistance of the digital potentiometer associated with the variable level shunt switch circuitry. Thereafter, a signal can again be sent through another input line (e.g., TXD2) to assert the line and electrically connect the power data bus line to the common bus line, driving the voltage to a lower voltage value based on the set resistance value of the digital potentiometer. For example, the resistance of the digital potentiometer might be set to cause a drop in voltage to 4 volts DC.

An input line is asserted to drive the voltage to 8 volts DC. This voltage dip to 8 volts DC is detectable in a signal over the bus. For example, a primary unit monitoring the bus by repeatedly measuring (at a high rate) a voltage value of the power data bus wire will detect this voltage change.

The line can be repeatedly asserted in a pulsed manner to send a signal representing data over the bus (e.g., for receipt by the primary unit). For example, the line can be asserted for a time interval (driving the power data bus wire to 8 volts DC), left unasserted for the time interval (causing the power data bus wire to return to 16 volts DC), and then asserted again for the time interval (again driving the power data bus wire to 8 volts DC). The system could utilize a signaling scheme where 16 volts DC indicates a "1" bit value, while 8 volts DC indicates a "0" bit value. In this way, binary data comprising "0" bits and "1" bits can be sent as a signal over the bus.

It should be noted that some access control systems may require the line TXD2 to be used in conjunction with line TXD1 simultaneously.

Figure 5:
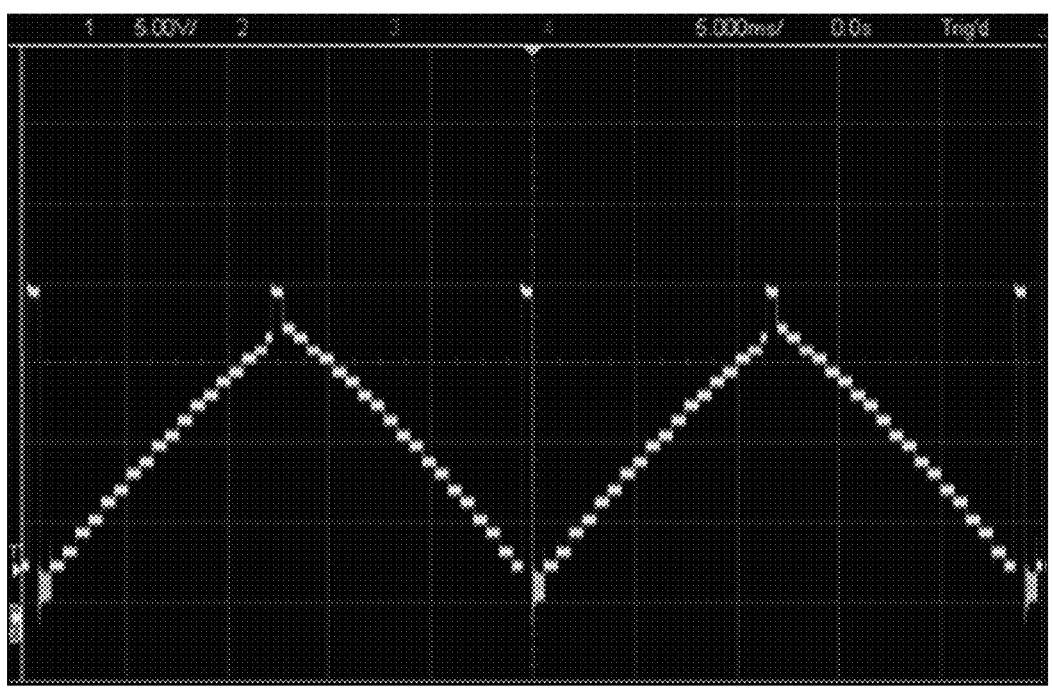
FIG. 5 illustrates an example of a signal that may be generated using a variable shunt in accordance with some embodiments.

FIG. 5 illustrates an example of a signal that may be generated using variable level shunt switch circuitry in accordance with some embodiments. Particularly, FIG. 5 illustrates an example of a signal that may be generated using TXD2 to drive a ramp in steps of 0.8V from 4V20V→4V on a 24V bus with 1K source series resistance. In the below chart, limitations may include that a rate of change is dictated by the I2C bus speed and updates of the digital pot, (e.g., approximately −300 uS) per update at 100 KHz I2C clock for random writes.

The DIBT circuitry may also include AC-driver circuitry for implementing an AC-coupled logic driver. AC driver circuitry may be used to modulate signaling on top of DC.

By way of example, DIBT circuitry may include a 4-volt peak to peak driver that is AC-coupled onto the bus. This may be used for access control systems that use DC to power their legacy interface devices and use AC signal coupling to provide a signal. Accordingly, AC driver circuitry may be used to provide, generate, or synthesize such an AC signal.

AC driver circuitry may include, for example, a driver component 409 (e.g., an operational amplifier, comparator, or Class B 4-volt peak-to-peak driver) that takes input from TXD3 and an enabling input line. AC driver circuitry may also include a polarized capacitor, and a solid-state relay.

In accordance with one or more preferred implementations, TXD3 provides a signal that represents a bit sequence (e.g. using a simple scheme with a first voltage value corresponding to a 0 and a second voltage value corresponding to a 1). A comparator, operational amplifier, or other component takes as input an enable line and TXD3, and outputs the signal from TXD3 if the enable line is asserted.

The driver component has an input terminal connected to a power input line (e.g. a 5 volt power input line), and generates a time-varying signal resembling an AC signal using voltage from the power input line based on the bit sequence embodied by signal from TXD3 (and possibly also based on a signaling scheme associated with a bus communication scheme, e.g. based on settings or a signal provided to the AC driver circuitry). An output terminal of the driver component is connected to a polarized capacitor 411.

During operation, voltage changes over the output line from the driver component connected to the capacitor impact charge buildup and discharge on the plates of the capacitor (e.g. electron movement), mimicking flow of alternating current through the capacitor (in actuality, electromagnetic fields within and around the capacitor cause movement of charge).

An input line from the capacitor 411 to the solid-state relay can be asserted to switch the solid-state relay to a closed switch state that physically connects output from the capacitor to the power data bus line (thus coupling the signal provided as input to the solid-state relay on top of the signal of the bus). Various signaling and modulation schemes may be utilized for the signal, based on configuration settings stored in memory of the interface device determined based on an indicated model of an intercom access control system that the interface device is connected to. For example, frequency shift keying (FSK), amplitude shift keying (ASK), and other modulation schemes may be utilized.

Figure 6A:
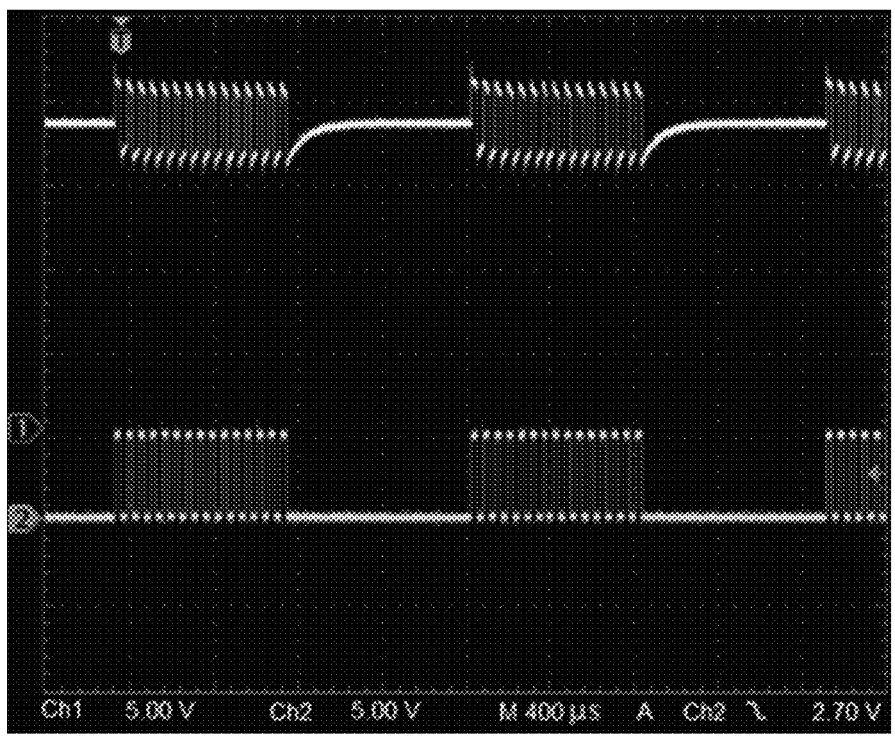
FIG. 6A illustrates a first example of a signal that may be generated using an AC driver in accordance with some embodiments.

FIG. 6A illustrates a first example of a signal that may be generated using an AC driver in accordance with some embodiments. FIG. 6A illustrates an example of a signal that may be generated using TXD3 to drive a 18 KHz carrier, 1200 baud Amplitude Shifting Key (ASK) on an 18 V DC bus with 1K source series resistance. In the below chart, the upper trace corresponds to the 18 V DC bus and the lower trace corresponds to TXD3.

Figure 6B:
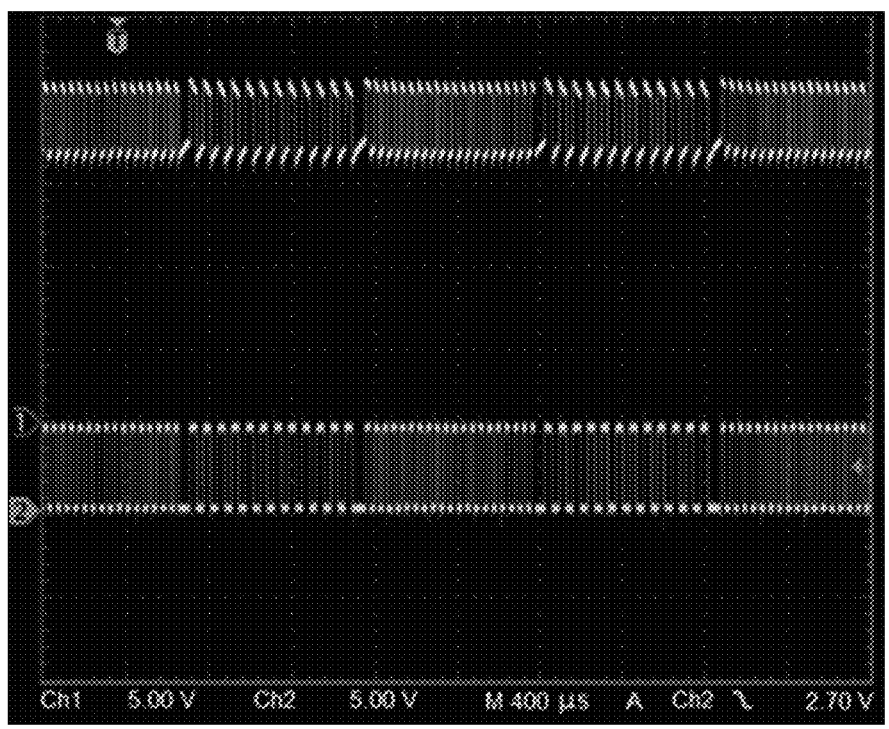
FIG. 6B illustrates a second example of a signal that may be generated using an AC driver in accordance with some embodiments.

FIG. 6B illustrates a second example of a signal that may be generated using an AC driver in accordance with some embodiments. FIG. 6B illustrates an example of a signal that may be generated using TXD3 to drive a 15/25 KHz BFSK, 1200 baud on an 18 V DC bus with 1K source series resistance. In the below chart, the upper trace corresponds to the 18 V DC bus and the lower trace corresponds to TXD3.

Another example of fixed level shunt switch circuitry is illustrated with respect to input line or trace TXD4. The circuitry may include a resistor 403 having a predetermined (or fixed) level of resistance. In some embodiments, the resistor may provide a resistance level of 224 ohm or 430 ohm. This circuitry would typically be used alongside access control systems that use a resistive load.

Another example of circuitry that may be implemented within a DIBT is that illustrated in association with TXD5 that electrically connects a power data bus connection line to a power connection line. This circuitry may be used to pull additional power in order to accommodate certain access control systems. Particularly, some access control systems will drive the voltage of a bus higher for signaling (e.g., higher than a resting voltage of a data bus or power data bus, or higher than the bus voltage that is available to the DIBT). In this scenario, additional voltage can be pulled from a power bus line.

One or more preferred implementations may include a collection of components implementing such an approach that include a switch or other electrical connection that can be closed based on assertion of a trace or input line (e.g. TXD5).

In accordance with one or more preferred implementations, a transistor is utilized as a switch, with an input line connected to a third terminal (e.g., a gate terminal), a power data bus connection line connected to a first terminal (e.g., a source terminal), and a power bus connection line connected to a second terminal (e.g., a drain terminal). In accordance with one or more preferred implementations, other components may be utilized to effect opening and closing of a shunt, such as a type of MOSFET, another type of field effect transistor, another type of transistor, a switch, a solid-state relay, etc.

It should be noted that in order to configure the digital interface board to work with a particular access control system, shunt switch circuitry can be activated or deactivated based on configuration settings. Shunt switch circuitry may include one or more components capable of enabling or preventing the flow of current or electrons. In some cases, shunt switch circuitry may include transistors or electrically controlled switches and relays that selectively provide or restrict a conduit for power. In some examples, such components may include a transistor in communication with a capacitor that stores a state. An example of this may be a metal-oxide-semiconductor field-effect transistor (MOSFET) (e.g., MOSFET 404(1-3)) that is capable of setting an "on" or "off" state, corresponding to electrical connection (e.g., for current or electrons) between the access control system and the bus power data 402 (e.g., over the respective shunt).

It should be noted that latching relays require power to switch between open and closed but do not require a maintenance current to keep the circuit open or closed. Accordingly, certain electronic switches and relays may be well suited for use in a shunt circuitry configured to maintain a state since only a small voltage is required to change the switch from "off" to "on" and as such there is little chance of the power source being depleted while stored.

Figure 7:
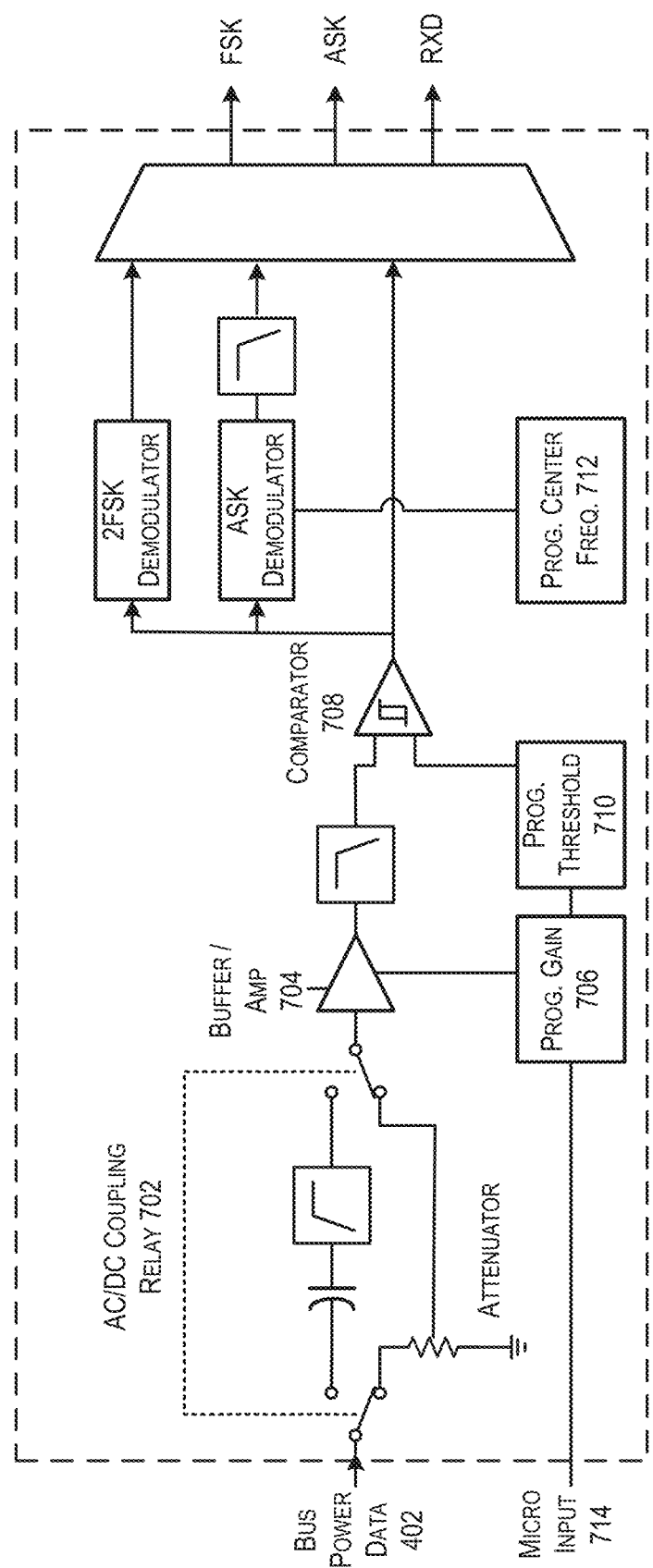
FIG. 7 illustrates an example digital interface board receiving circuit that may be implemented in accordance with some embodiments.

FIG. 7 illustrates an example DIBR circuitry that may be implemented in accordance with some embodiments. The DIBR circuitry may receive a raw digital signal representing bus data from a power data bus connection line and provide demodulated output data. In some cases, the DIBR is capable of processing a signal to provide three separate types of output data. Particularly, the DIBR may be capable of generating receiving data (RXD) output, Amplitude Shift Keying (ASK) output, and Frequency Shift Keying (FSK) output. RXD output may be a conditioned and filtered copy of the signal received from the bus power data line 402 of the DIBT. ASK output and FSK output may each be demodulated versions of the RXD output.

In some embodiments, the DIBR includes an AC/DC coupling relay 702 configured to condition and attenuate any signal received at the circuit in order to prevent burning out the circuit.

The DIBR may include a buffer amp 704 configured to isolate the signal from the rest of the circuit to prevent overload. In some cases, the signal may also be amplified as it is buffered (e.g., via the use of a programmable gain 706). For example, if a weakly-modulated signal is received at 0.5 volts, that signal can be amplified to 2-3 volts so that it can be used.

The DIBR may include a comparator 708 that acts as a low-pass filter by comparing the signal coming out of the buffer against a programmable threshold 710. Such a programmable threshold 710 may be selected and stored by the DIBR based on the type of access control system at issue.

The DIBR may include one or more demodulator components configured to provide demodulation of the signal using a particular demodulation scheme (in cases for which signal demodulation is needed). In some cases, such components may include at least a Frequency Shift Keying (2FSK) demodulator and an Amplitude Shift Keying (ASK) demodulator. The type of demodulation scheme to be used in a particular scenario may be determined based on configuration settings stored in relation to a type of access control system used along with the DIBR. In the case that an ASK demodulation scheme is used, a programmable center frequency 712 may be stored specific to the access control system (12 kHz, 22 kHz, 50 kHz, etc.). In embodiments, one or more programmable values may be stored at the various I²C circuits via a micro controller input 714.

It should be noted that one or more of the programmable variables used by the digital interface board, such as the programmable gain 706, programmable threshold 710, or programmable center frequency 716 may be provided via an inter-integrated circuit I²C serial communication bus. The values provided by the I²C bus may be determined based on configuration settings associated with an access control system.

While a number of hardware components are described above as being included in embodiments of a digital interface board, it should be noted that the digital interface board may also include processor executable instructions for implementing the functionality described herein (e.g., asserting various electrical pathways). Such processor executable instructions may be stored as firmware or another suitable programming application on a memory of the digital interface board. In embodiments, the digital interface board may store a number of different applications, such that an appropriate application may be selected and implemented from those different applications based on information included in configuration data specific to a particular access control system. The selected application may be used to control which electrical pathways (e.g., shunts) are asserted in the DIBT circuitry as well as the processing that is performed (e.g., selection of a demodulation scheme) on the DIBR circuitry. Some exemplary applications for implementing signal processing using the digital interface board are presented below, though it should be noted that these are merely exemplary in nature.

In some embodiments, the programming applications stored on, and implemented by, the digital interface board may include an application for handling access control systems that use an On-Off Keying (OOK) signaling scheme. For the purposes of the following illustration, such a system may use a nominal voltage of 18-40 V.

With respect to the DIBT circuitry, an exemplary application configured to handle an OOK signaling scheme may cause shunt switch circuitry (e.g., shunt switch circuitry controlled by input line TXD1 of FIG. 5) to be used. Such an exemplary application may cause the input line to repeatedly be asserted to drive the bus to 0 V for a "low" signal and then to be deasserted in order to allow the bus to float (i.e., disconnect from a ground to allow the voltage to return to a higher value) to a nominal voltage for a "high" signal.

With respect to the DIBT circuitry, an exemplary application configured to handle an OOK signaling scheme may cause an AC/DC coupling relay to be configured for DC-coupled input (e.g., no rectification is needed). An input gain may be set to "1" to amplify the incoming signal. A data value of 1 V may be provided as a programmable threshold to be used by a comparator to filter noise from the signal. Furthermore, the application may cause the DIBR circuitry to be configured to generate receiving data (RXD) output with "0" for low bus voltage, and "1" for high bus voltage.

In some embodiments, the programming applications stored on, and implemented by, the digital interface board may include an application for handling access control systems that use an ASK/FSK signaling scheme. For the purposes of the following illustration, such a system may use a nominal voltage of 18-40 V. The signal may include ~4 Vpp AC-coupled signal on top of the bus power with a signaling range of between 12 KHz and 50 KHz.

With respect to the DIBT circuitry, an exemplary application configured to handle an ASK/FSK signaling scheme may utilize AC driver circuitry (e.g., circuitry connected to TXD3). This may involve first asserting an input to provide an enable signal (e.g., TXD3 Enable). It should be noted that some amount of wait time may be necessary to allow the relay to settle. For example, a 10 ms wait may be required after asserting TXD3 Enable before asserting TXD3. The TXD3 input line to the AC driver circuitry can then be repeatedly asserted to drive the bus "high" and deasserted to drive the bus "low." Once the transmission is complete, the enable signal is then deasserted.

With respect to the DIBR circuitry, an exemplary application configured to handle an ASK/FSK signaling scheme may cause an AC/DC coupling relay to be configured for AC-coupled input causing the incoming signal to be rectified to DC. An input gain may be set to "1" for signaling greater than 2 V peak to peak (p-p) and set to "2" or more for signaling less than 2 V p-p.

Furthermore, the application may cause the DIBR circuitry to be configured to generate ASK receiving data (ASKRXD) output or FSK receiving data (FSKRXD) output. ASKRXD data generated in this manner may use "0" for a demodulated bit with no signal carrier present and "1" for a demodulated bit with a signal carrier present. FSKRXD data generated in this manner may use "0" for a demodulated "low frequency" bit (e.g., 18 KHz with center frequency 20 KHz) and "1" for a demodulated "high frequency" bit (e.g., 22 KHz with center frequency 20 KHz). In some cases, ASKRXD may be used as a Carrier Detect.

In some embodiments, the programming applications stored on, and implemented by, the digital interface board may include an application for handling access control systems that use 3-wire digital signaling. As noted elsewhere, most access control systems that use digital signaling use two wires, one of which has a positive polarity and the other of which is a common or ground (which is sometimes characterized as negative). However, some systems that use digital signaling may include a third wire that typically carries power.

With respect to the DIBT circuitry, an exemplary application configured to handle signaling scheme used by a 3-wire system may be similar to that of the OOK application described above. An application for handling access control systems that use 3-wire digital signaling with two power wires and one data wire may cause shunt switch circuitry (e.g., that associated with line TXD1 of FIG. 5) to be used. Such an exemplary application may cause the TXD1 line to repeatedly be asserted to drive the bus to 0 V for a "low" signal and then to be deasserted in order to allow the bus to float to a predetermined voltage (e.g., 8 V) for a "high" signal.

With respect to the DIBR circuitry, an exemplary application configured to handle signals provided by the 3-wire system may cause an AC/DC coupling relay to be configured for DC-coupled input (e.g., no rectification is needed). An input gain may be set to "1" to amplify the incoming signal. Furthermore, the application may cause the DIBR circuitry to be configured to generate receiving data (RXD) output with "0" for low bus voltage, and "1" for high bus voltage.

In some embodiments, the programming applications stored on, and implemented by, the digital interface board may include an application for asserting multiple lines or traces to use different shunt switch circuitry. For example, some access control systems may require the use of two or more lines, e.g., TXD1 and TXD2.

With respect to the DIBR circuitry, an exemplary application configured to handle an OOK signaling scheme may cause an AC/DC coupling relay to be configured for DC-coupled input (e.g., no rectification is needed). An input gain may be set to "1" to amplify the incoming signal. Furthermore, the application may cause the DIBR circuitry to be configured to generate receiving data (RXD) output with "0" for low bus voltage, and "1" for high bus voltage.

In some embodiments, with respect to the DIBT circuitry, an exemplary application configured to handle a signaling scheme that requires dual-line assertion may cause first shunt switch circuitry (e.g., associated with line TXD1 of FIG. 5) to be asserted as described in relation to the applications for OOK systems as described above as well as second shunt switch circuitry (e.g., associated with line TXD2) to be asserted separately. In an example, the application may repeatedly assert a line associated with variable level shunt switch circuitry to drive the bus to 7 V for a "low" signal and deassert the line to float the bus for a "high" signal.

In some embodiments, with respect to the DIBT circuitry, an exemplary application configured to handle a signaling scheme that requires dual-shunting may cause the variable level shunt switch circuitry to lower the bus voltage to 7 V for a duration of transmission. The shunt switch circuitry associated with another line (e.g., TXD1) can then be repeatedly asserted to drive the bus to 0 V for a "low" signal and then deasserted to drive the bus to 7 V for a "high" signal. Once the transmission is complete, the variable voltage shunt can be deasserted to release the bus to float back to a nominal level (e.g., 30 V).

Figure 8:
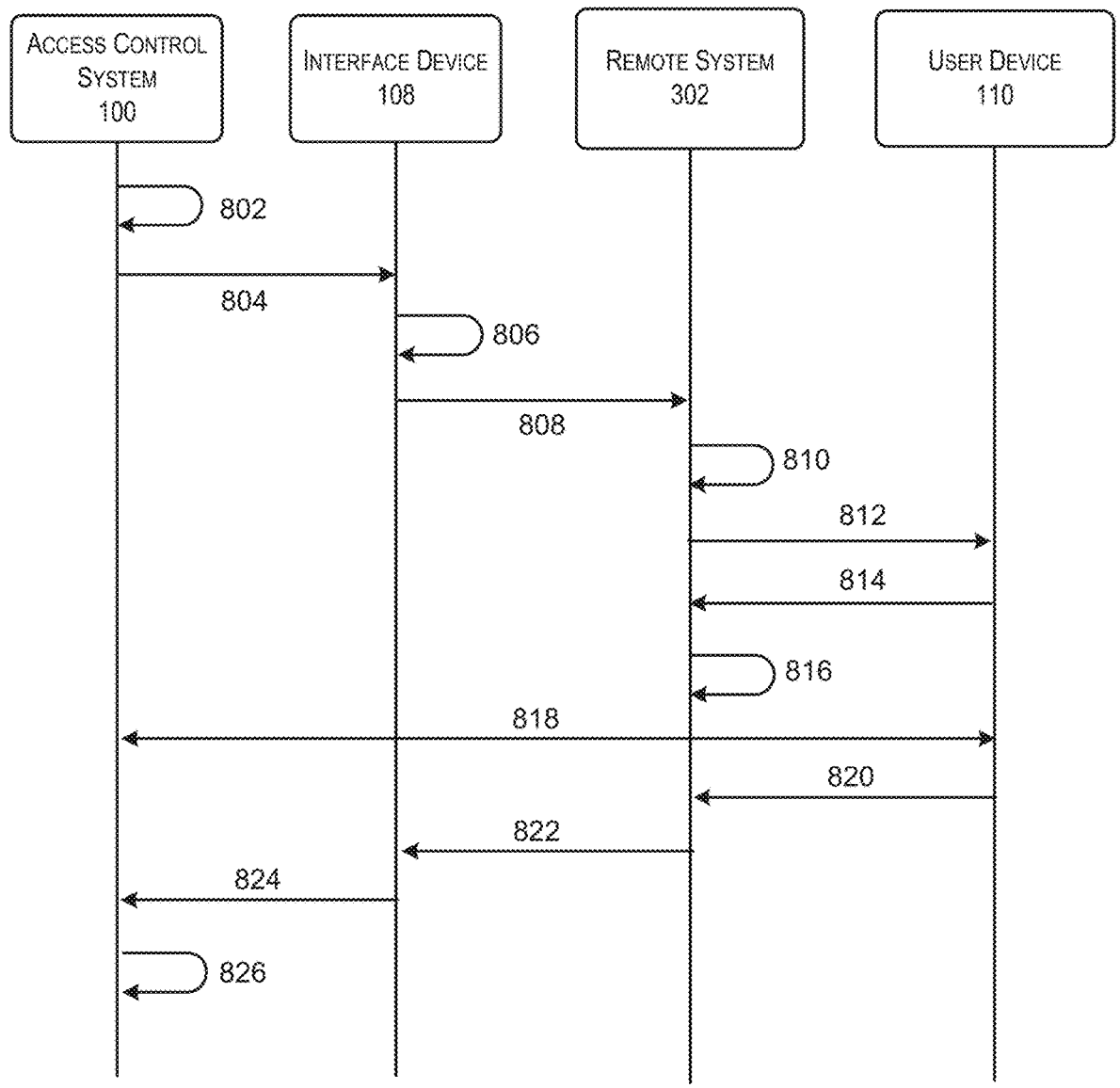
FIG. 8 depicts a flow diagram illustrating a process for enabling remote access to an access control system using an interface device in accordance with some embodiments.

FIG. 8 depicts a flow diagram illustrating a process for enabling remote access to an access control system using an interface device in accordance with some embodiments. The process 800 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 800 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 800 of FIG. 8 may be performed by one or more elements of the system described herein. For example, the process 800 may be performed by an intercom access control system 100, an interface device 108 and/or a user device 110 as described with respect to FIG. 1 as well as a remote system 302 as described with respect to FIG. 3. The code may be stored on a computer-readable storage medium, for example, in the form of a computer program including a plurality of instructions executable by one or more processors. The computer-readable storage medium may be non-transitory.

Process 800 begins at 802 when a request is received by a visitor at a primary unit of the access control system to contact a resident of a secure area controlled by the access control system. In some cases, this may involve the visitor pressing a button for a unit associated with the resident. When the request is received, a signal is transmitted over a bus of the access control system.

As noted elsewhere, an interface device 108 may be installed in parallel to a legacy interface device such that a signal transmitted over the bus of the access control system to the legacy interface device is also received at the interface device at 804. Accordingly, when a visitor presses a button on a master control unit, a signal is generated and transmitted which is received at the interface device 108.

Prior to receiving the signal, a digital interface board of the interface device may be provided with configuration settings specific to the access control system. Such configuration settings may indicate particular electrical pathways to be asserted and for what pattern/timing. Upon receiving a signal from an access control system, the interface device may process the received signal at 806, by asserting certain pathways in the circuit according to a frequency/pattern indicated in configuration settings. In some cases, this may further involve adjusting a voltage of the signal and/or demodulating that signal in accordance with an appropriate demodulation scheme.

Once the signal has been routed through electrical pathways of the digital interface board, data generated based on the signal may be relayed to a remote system 302 at 808. In some embodiments, the data provided by the interface device 108 to the remote system 302 may include an identifier that may be used to uniquely identify the interface device. At 810, the identifier provided in the data may be used to identify an account associated with the interface device as well as one or more user devices 110 associated with that account.

Upon identifying a user device 110 associated with the account, the remote system 302 provides a notification to that user device at 812. For example, the remote system may transmit a push notification to the user device. In this example, the push notification causes an access application installed on the user device to display a message or alert indicating that the visitor is requesting to contact the user. In some cases, the notification may include an image obtained from the primary unit of the access control system.

Once the message has been presented on the user device 110, a user may authorize a communication between that user and the visitor requesting contact. In some cases, this may involve the user pressing a button presented on the display of the user device along with the presented message. Upon receiving an indication from the user that the contact is authorized, the user device may transmit an authorization message to the remote system 302 at 814.

Upon receiving an authorization message from the user device 110, the remote system may establish a communication session between the user device and the primary unit of the access control system at 816. In embodiments, this may involve establishing a first communication session between the user device 110 and the remote system 302 and a second communication session between the remote system 302 and the interface device 108. In these embodiments, the interface device is hardwired to the access control system, in that messages can be conveyed between the interface device and the primary unit of the access control system via a physical connection. Audio and/or video data may be routed at 818 between the primary unit of the access control system and the interface device via the physical connection, between the interface device and the remote system via the first communication session, and between the remote system and the user device 110 via the second communication session.

In embodiments, the primary unit captures audio and/or video input provided by a visitor located in proximity to the primary unit. The audio and/or video input captured by the primary unit is conveyed to the user device at 818. Additionally, the user device captures audio and/or video input provided by a user of the user device. In these embodiments, the audio and/or video input captured by the user device is conveyed to the primary unit at 818. In these embodiments, the user of the user device is able to communicate with the visitor located proximate to the primary unit using audio and/or video communication.

At 820, the user may provide an indication that the visitor is to be granted access to a secure area via the access control system. In some cases, the indication may be generated upon the user of the user device selecting a button presented on the user device. The indication may be forwarded by the remote system 302 to the interface device at 822.

In some cases, when the interface device is first installed in parallel to a legacy interface device of the access control system, an unlock signal may be generated by that legacy interface device during an unlock event. The unlock signal may be detected and stored by the interface device 108. Upon receiving an indication that the visitor is to be granted access to the secure area, the interface device may generate or replay the unlock signal to the access control system at 824. At 826, upon receiving the unlock signal, the access control system provides a signal to a locking mechanism securing a secure area to cause it to unlock, granting access to the secure area.

Figure 9:
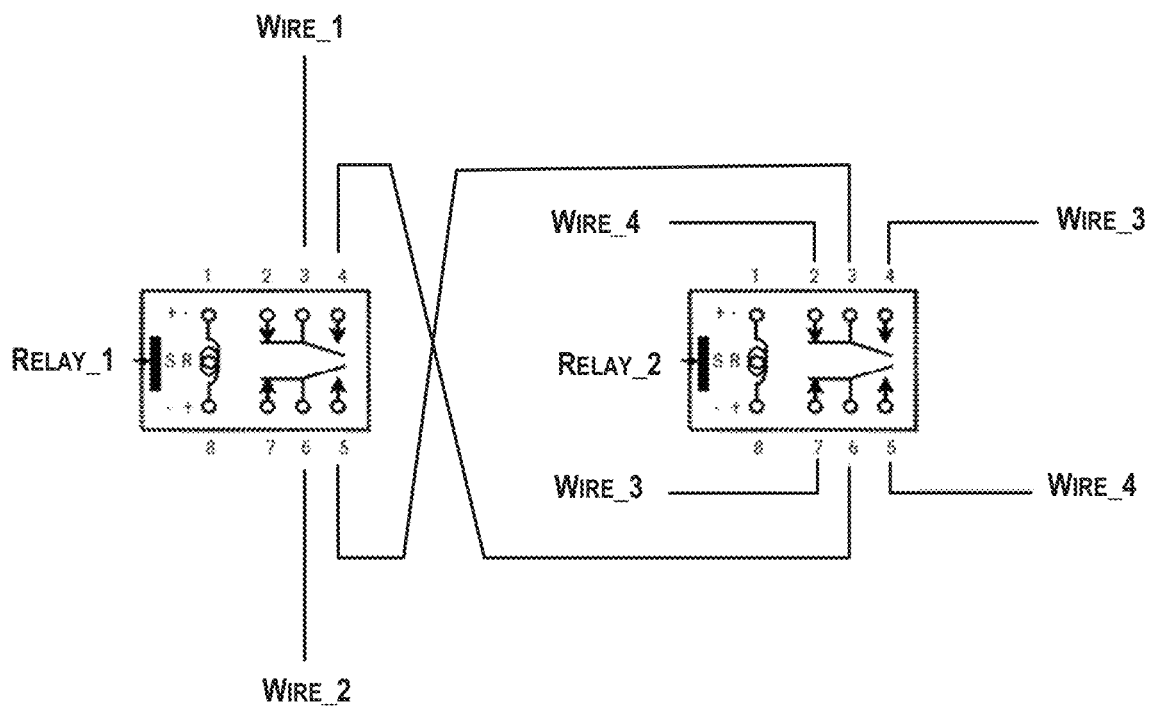
FIG. 9 depicts an example of a polarity detection/switching circuit that may be included in an interface device to provide automatic polarity adjustment in accordance with embodiments.

FIG. 9 depicts an example of a polarity detection/switching circuitry 900 that may be included in an interface device to provide automatic polarity adjustment in accordance with embodiments. As noted elsewhere, some access control systems may use bus systems that are polarity independent, in that users are unable to tell which wire is positive and which wire is ground. Attaching the interface device to such a system can damage it in the event that the polarity is opposite what it should be. In order to be used effectively with such systems, an interface device may have included within it a circuit capable of detecting a polarity of the bus system and automatically switching polarities when needed.

The depicted circuit 900 includes a means to tell which wire is positive and which is ground after users install the interface device in an access control system. Firmware is then able to utilize the information to control switches/relays to make the correct connection between the two incoming in-polarized wires and two internal polarized terminals.

As depicted, the circuit 900 may include two relays working in tandem. Particularly, the circuit 900 may include a Relay_1 and a Relay_2, where the access control system is connected to Relay_1 and the digital interface board is connected to Relay_2. More particularly, polarized wires in the bus system of the access control system are connected to Wire_1 and Wire_2 of Relay_1 of the circuit 900.

The circuit 900 uses a resistor network with protection diodes (e.g., Schottky diodes) to generate a logic signal (e.g., Polarity), that can be read by firmware executed on the circuit in order to determine whether the bus wire connected to Wire_1 is positive or ground based on the logic signal being logic high (e.g., 1) or logic low (e.g., 0). The firmware is then able to cause the Relay_1 to be flipped from a RESET position to a SET position (connecting Wire_1 to Wire_3 and Wire_2 to Wire_4) based on the determined polarity value. The firmware may additionally be able to cause the Relay_2 to be flipped from RESET position to a SET position (connecting BUS2 to BUS_PD and BUS1 to BUS_COM) based on the determined polarity value.

Upon being connected to the access control system, the circuit 900 may determine a polarity of the wire connected to BUS1 as well as a polarity of the wire connected to BUS2. Based on the determined polarity of the wires connected to BUS1 and BUS2, the firmware may configure a relay switch to alter pathways within the circuit such that the polarity of the connections to a digital interface board remain constant.

Figure 10:
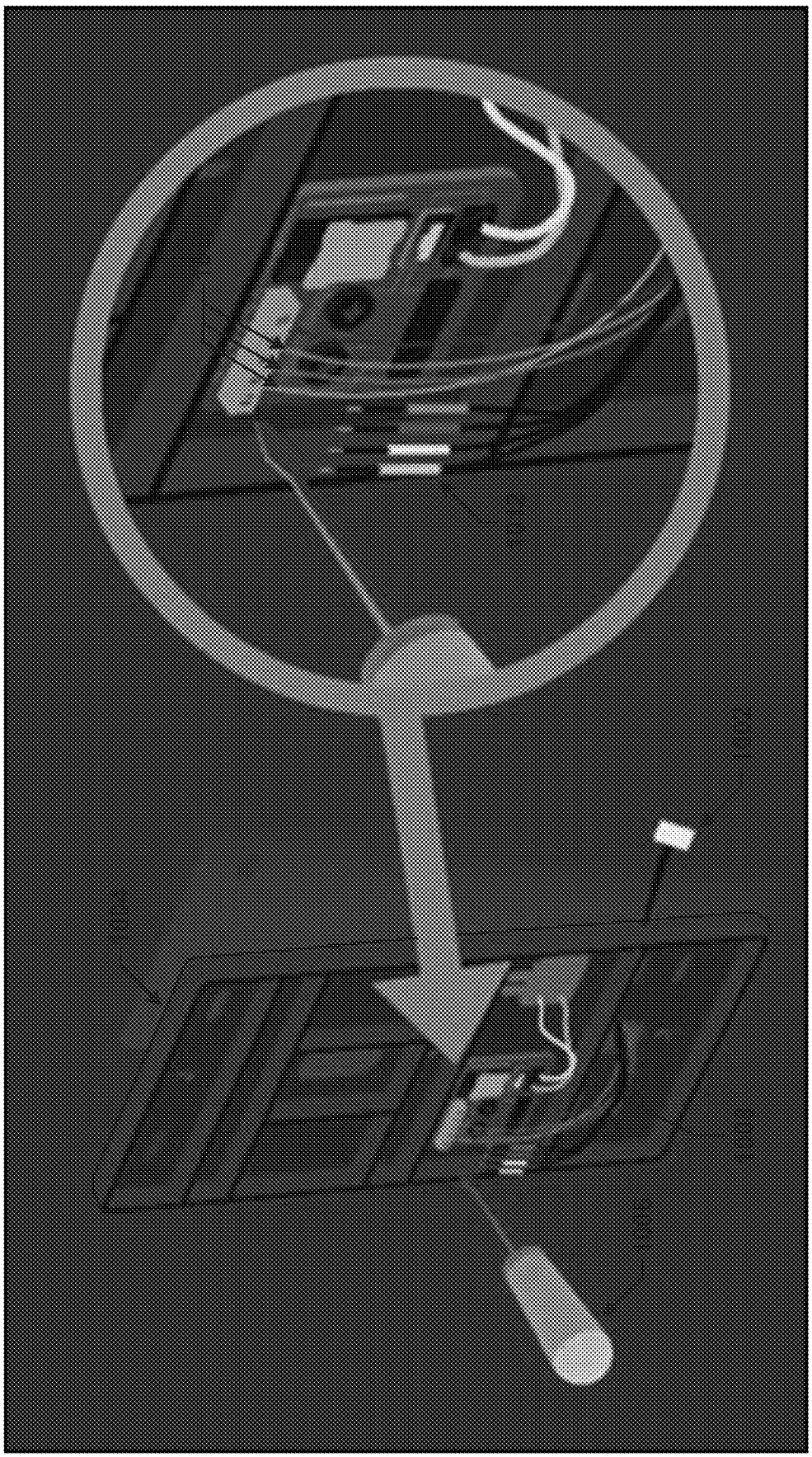
FIG. 10 depicts an example of a procedure for installing an interface device in communication with an access control system in embodiments

FIG. 10 depicts an example of a procedure for installing an interface device in communication with an access control system in embodiments. As depicted in FIG. 10, detailed instructions for installing an interface device of the disclosure in parallel to a legacy interface device may be provided to a user. In some cases, such instructions may be provided to the user via his or her user device (e.g., smartphone).

In some embodiments, a remote system (e.g., remote system 302) may store detailed installation instructions related to a number of different types of access control systems. In these embodiments, upon receiving an indication from a user that the user wishes to install the interface device for use with a particular access control system (e.g., as specified by the user), the installation instructions related to that access control system are retrieved and provided to the user.

In embodiments, the interface device is configured to receive (and establish a connection with) a universal input bus 1002, which is further configured to be electrically coupled with a legacy handset device 1004. The universal input bus may include connector (e.g., a 12-pin connector) as well as a number of wires 1008 that may be used to connect it to the legacy interface device. The wires 1008 may be coded via a color and/or pattern on respective wires. In embodiments, the installation instructions may provide steps for removing a faceplate from the legacy handset device or otherwise exposing circuitry of the handset device. Additionally, the installation instructions may include an indication of one or more tools 1006 that may be needed during the installation process.

As noted above, the universal input bus 1002 may include a number of wires 1008 that may be used to electrically couple the bus 1002 to the circuitry of the legacy handset device. Instructions may be presented to the user to connect a selection of the wires 1008 to connection points 1010 of the circuitry of the legacy interface device 1004. In various cases, this may involve directing the user to connect specified wires to specified connection points in a specified manner. To make the various electrical connections, the user may be directed to connect wires to terminals (e.g., push-in terminals, make pigtail connections, make solder connections, or use any other suitable electrical connection type.

The wires 1008 may include wires configured to relay both analog and digital signals to the interface device. It should be noted that during installation of the universal input bus 1002, only a subset of the wires 1008 may be used for any given access control system. For any given access control system, some of the wires 1008 may remain unused (as shown at 1012).

By way of a first example, if the access control system uses digital signaling, then only the wires 1008 associated with digital signaling may be coupled to the legacy interface device 1004. In this example, the user may be directed to connect two wires that have a polarity of positive and ground respectively (which may fluctuate in systems that use AC current) to their respective connection points. Note that for some digital access control systems, the user may be directed to connect a third wire used to convey power.

By way of a second example, if the access control system uses analog signaling, then only the wires 1008 associated with analog signaling may be coupled to the legacy interface device 1004. Instructions may be provided to the user to connect wires associated with various functions (e.g., audio in, audio out, doorbell ring, etc.) to the respective circuitry in the legacy interface device 1004.

Figure 11:
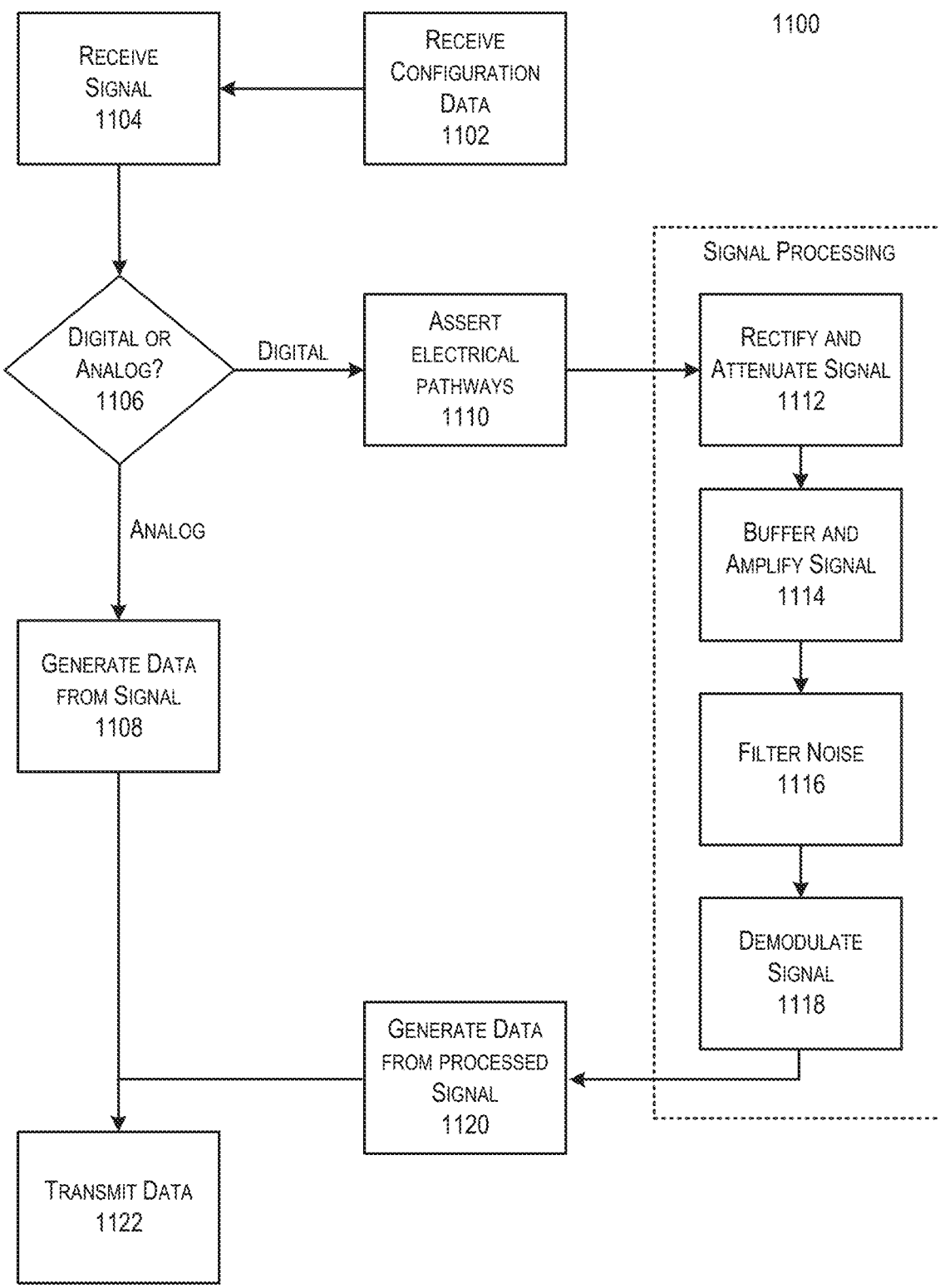
FIG. 11 depicts a flow diagram illustrating a process for processing a signal received at an interface device in accordance with embodiments.

FIG. 11 depicts a flow diagram illustrating a process 1100 for processing a signal received at an interface device in accordance with embodiments. An interface device may be configured to process a single received from an access control system. As noted elsewhere, the interface device may include both a digital interface board (e.g., digital interface board 210) for processing digital signals as well as an analog interface board (e.g., analog interface board 212) for processing analog signals.

At 1102, an interface device may receive configuration data to be used in processing signals received at the interface device. As noted elsewhere, the configuration data may be specific to a particular access control system that the interface device is electrically coupled to. In some cases, the configuration data may be selected from a table of configuration settings stored in relation to the access control system. For example, a user may provide an indication of the access control system being used. In this example, the configuration setting table associated with that access control system may be identified and the configuration settings may be retrieved from that table to be applied to the interface device.

At 1104, a signal is received at the interface device from an access control system. As noted elsewhere, the received signal may be formatted or encoded using a format that is proprietary to the access control system being used.

At 1106, the signal may be treated differently based on whether the received signal is an analog signal or a digital signal. It should be noted that the interface device may not perform any active determination at this step. Rather, since the wiring of the interface device is connected to the legacy interface bus in a manner that receives analog and digital signals through separate inputs (e.g., see FIG. 10 above), digital and analog signals may automatically be treated differently by the interface device upon being received.

At 1108, if the signal is an analog signal, the signal may be relayed over a number of separate wires. In this case, various functions of the access control system may be relayed over specific wires. For example, upon a visitor attempting to contact a resident associated with the interface device, the interface device may receive a "doorbell ring" signal from the access control system over a wire dedicated to providing such a signal. Accordingly, data may be generated from the received analog signal based on information included in the signal as well as which wire the signal was received over.

If the signal is a digital signal, the signal may need to be processed/translated from a proprietary format before usable data can be generated from it. Note that in such a digital signal, a single pair of wires can be used to convey a number of different types of data. In such cases, the different types of data may be encoded into the signal in a manner that is intended to be interpretable by the legacy interface device, but not necessarily other electronic devices. Accordingly, it may be necessary to convert the received signal into a common format in order to extract information from that signal that can be used to generate data.

At 1110, one or more electrical pathways may be asserted based on the configuration data received at 1102. As noted elsewhere, inputs to one or more of a number of shunts may be asserted to route the signal through them. In embodiments, the shunts may be pulsed, or otherwise asserted, at a frequency and duration indicated in the configuration data received a 1102.

The steps 1112-1118 each represent signal processing that can be performed on the received signal by routing that signal through a digital interface board (e.g., digital interface board 210). It should be noted that some of the steps 1112-1118 may or may not be performed for a particular signal based on information received in the configuration data at 1102.

In some cases, the received signal may be rectified and/or attenuated at 1112 to prevent burnout of the digital interface board. It should be noted that the signal received by the interface device may vary according to the access control system from which it is received. Such a signal may be received in AC or DC, and in a wide range of voltages. In embodiments in which the signal is received in AC, the signal may be rectified (e.g., converted from AC into DC) via an AC/DC coupling relay (e.g., 702). In some embodiments, the signal may have a higher gain than is able to be received by the digital interface board. In such cases, the signal may be attenuated to reduce the gain using one or more attenuators (e.g., resistive voltage divider circuits). In some cases, the received signal may be buffered and/or amplified d at 1114. As noted elsewhere, the digital interface board may include a buffer/amplifier (e.g., 704) configured to isolate the signal from the rest of the circuit (to prevent overload). In some cases, the signal may also be amplified as it is buffered via the use of a programmable gain (e.g., 706). For example, if a weakly-modulated signal is received at 0.5 volts, that signal can be amplified to 2-3 volts so that it can be used. In this example, signal may be amplified if it is below a threshold value.

In some cases, the received signal may be filtered at 1116 to remove noise. As noted elsewhere, the digital interface board may include a comparator that acts as a low-pass filter by comparing the signal coming out of the buffer against a programmable threshold value. As noted elsewhere, the programmable threshold value may be specific to the access control system, and hence may be provisioned onto a micro-controller (e.g., an I2C circuit) based on the configuration data received at 1102.

In some cases, the received signal may be demodulated at 1118. As noted elsewhere, the digital interface board may include a number of different demodulator components configured to provide demodulation of the signal using a particular demodulation scheme. The type of demodulation scheme to be used in a particular scenario may be determined based on the configuration data received at 1102. In some cases, an electrical pathway that includes a particular demodulator component may be asserted based on the determined type of demodulation scheme to be used. By way of example, such demodulator components may perform ASK demodulation or 2FSK demodulation based on the access control system from which the signal is received.

At 1120, the process 11000 may involve generating data from the signal after it has been processed at steps 1112-1118 according to the received configuration data. In some embodiments, information associated with various functions/data may be isolated within the processed signal. Such information may be used to generate data that can be used by a downstream electronic device. For example, once the signal has been processed, audio information may be isolated within the processed signal and used to generate audio data that can be played by another electronic device using a standard audio player. In some embodiments, the data may be compressed or otherwise encoded in a manner that it would be usable. For example, an audio codec may be used by the interface device to compress audio data generated from the processed signal.

At 1122 of the process 1100, the data generated by the interface device is transmitted to another electronic device, such as a computing device included in a remote system (e.g., remote system 302). As noted elsewhere, the data (or at least a portion thereof) may then be routed by the remote system to a user device operated by a user of the interface device.

Figure 12:
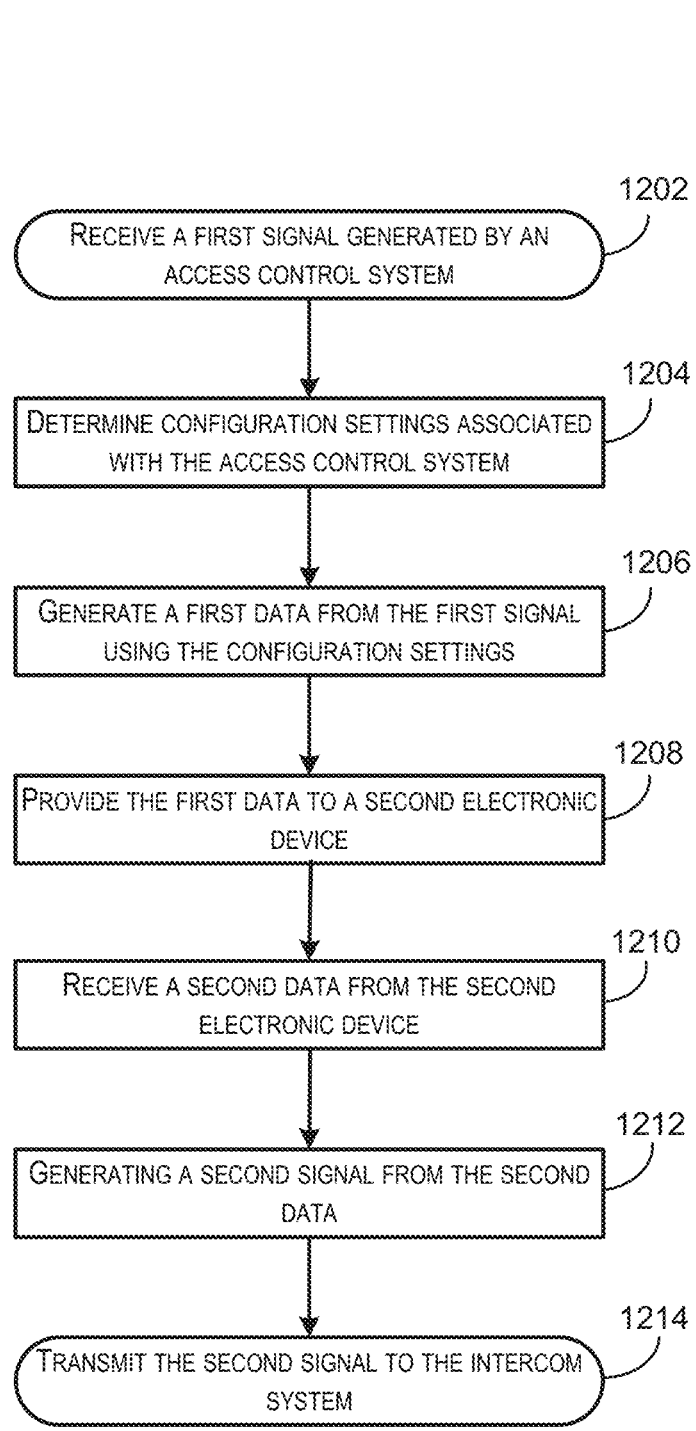
FIG. 12 depicts a flow diagram illustrating a process for enabling communication between an access control system and a user device using an interface device in accordance with embodiments.

FIG. 12 depicts a flow diagram illustrating a process for enabling communication between an access control system and a user device using an interface device in accordance with embodiments. As noted elsewhere, one example of an access control system may include an intercom system that is used to gain access to a building. In an environment that includes such a system, the interface device may be installed so that it is electrically connected to the access control system in parallel to a legacy interface device (e.g., an intercom handset). The access control system may be further electrically connected to a locking mechanism used to secure an area (e.g., a building).

At 1202, the process 1200 involves receiving, at an electronic device (e.g., an interface device) a first signal generated by the access control system. In some embodiments, the first signal, which may be generated by a primary unit of the access control system, may be a request to contact a user in order to gain entry to a secure area controlled by the access control system. In some cases, the first signal may convey at least one of audio data or video data captured by the primary unit.

At 1204, the process 1200 involves determining configurating settings associated with the intercom system. In some embodiments, the configuration settings are determined based on a mapping of configuration settings to a model associated with the access control system. For example, the interface device may store a number of tables that map particular access control systems to specified configuration settings. Upon determining what access system is being used with the electronic device (e.g., because the user has indicated a model or because the model has been determined automatically) the configuration settings mapped to that model of access control device may be retrieved and stored. In some embodiments, the configuration settings may be provided to the interface device by the second electronic device (e.g., a remote system) based on the determined model of the access control system.

At 1206, the process 1200 involves generating first data from the first signal based on the configurating settings associated with the access control system. In some embodiments, the first signal is in a first format associated with (e.g., proprietary to) the access control system. The first data may be generated by configuring one or more electronic pathways within a circuit board of the electronic device based on the configuration settings associated with the access control system. As noted elsewhere, the electronic pathways may include shunts, examples of which may include at least one of a fixed shunt, a variable voltage shunt, an AC driver shunt, a fixed resistive shunt, or a high side switch shunt.

In some cases, configuring one or more electronic pathways may be done by causing the shunts to be asserted in a manner determined based on the set of configuration settings. More particularly, this may involve causing one or more shunts to be pulsed by activating them at a predetermined frequency and for a predetermined amount of time. In some cases, configuring one or more electronic pathways may be done by selecting a demodulation scheme associated with the access control system.

At 1208, the process 1200 involves providing the first data to a second electronic device. In some embodiments, the second electronic device is a computing device included in a remote system, such as server included within a cloud computing platform. In these embodiments, the computing device may further be caused to provide a third signal to a user device associated with a user of the electronic device. In some cases, such a user device is identified based on being associated with an account that is also associated with the electronic device. The first data may be provided to the second electronic device in a second format different from the first format. In some cases, the second format may be a format that is commonly used to convey audio and/or video data.

At 1210, the process 1200 involves receiving, in response to providing the first data to the second electronic device, a second data from a user device. In some cases, the second data may include at least one of audio data or video data captured by the user device.

At 1212, the process 1200 involves generating a second signal from the second data. In embodiments, this may involve routing the second signal through one or more additional electronic pathways in the circuit board that are configured based on the configuration settings. The second signal may then be provided to the access control device at 1214.

In some embodiments, the process 1200 may further involve receiving, from the at least one second electronic device, a third signal representing authorization to grant access to the secure area, generating an unlock signal, and providing the third signal to the access control system. In some embodiments, the third signal is generated by replaying an unlock signal previously captured by the electronic device from the legacy interface device. For example, once the electronic device has been installed in parallel to a legacy interface device of the access control system, the user may initiate an unlock event using the legacy interface device. In this example, the user may press a button on the legacy interface device to cause the secure area to be unlocked. Upon determining that the button has been pressed, the legacy interface device may generate an unlock signal that is transmitted to the primary unit to cause the locking mechanism to be released. Because the electronic device is installed in parallel to the legacy interface device, the electronic device may detect and store/copy the unlock signal generated by the legacy interface device. In some embodiments, the third signal may be generated by replaying or duplicating the stored unlock signal.

Figure 13:
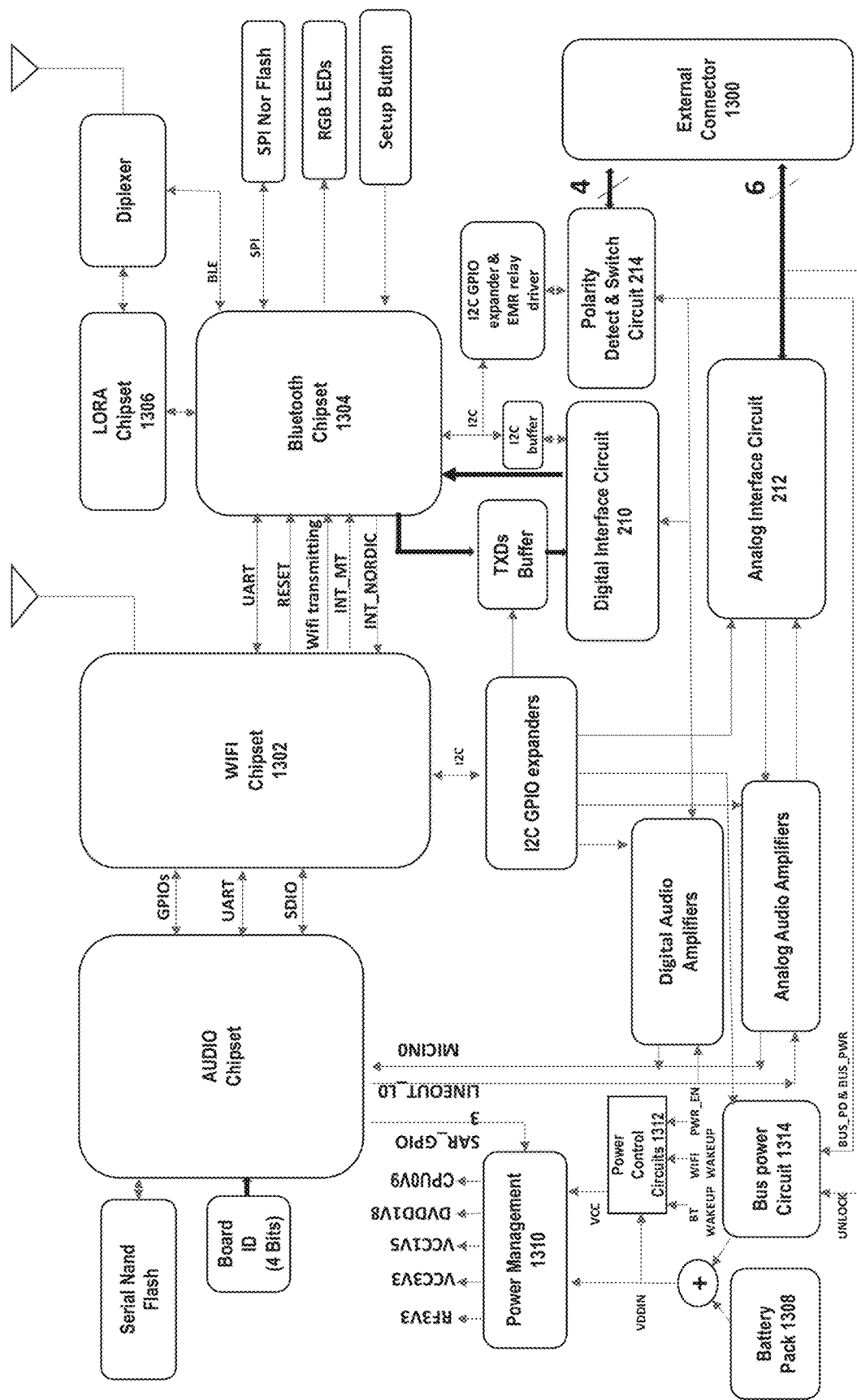
FIG. 13 depicts a block diagram illustrating an exemplary interface device having a number of various components in accordance with embodiments.

FIG. 13 depicts a block diagram illustrating an exemplary interface device having a number of various components in accordance with embodiments. As noted elsewhere, the interface device may include a number of circuits as described herein, including a digital interface circuit 210, an analog interface circuit 212, and a polarity detection & switching circuit 214. The interface device may connect to an access control system via an external connector 1300. As noted elsewhere, the external connector 1300 may be a pin connector (e.g., a 12-pin connector).

In accordance with one or more preferred implementations, an interface device is wired in parallel with an existing legacy intercom handset. Consider an exemplary scenario where a legacy intercom handset is connected to a "two-wire" intercom system, with a first wire being a power data wire corresponding to a power data bus, and a second wire being a ground or common wire corresponding to a ground or common line. The first wire is connected to a first connector of the legacy intercom handset, and the second wire is connected to a second connector of the legacy intercom handset. In accordance with one or more preferred implementations, an interface device is wired in parallel with the legacy intercom handset by connecting a third wire to the first connector of the legacy intercom handset and a third connector of the interface device, and connecting a fourth wire to the second connector of the legacy intercom handset and a fourth connector of the interface device.

As noted elsewhere, the interface device may include a communication interface (e.g., communication interface 216 as described in relation to FIG. 2 above). Such a communication interface may include various communication components for establishing communication between the interface device and another electronic device, such as a computing device of a remote system as described herein. The communication components may include chipsets for providing both long-range and short-range wireless transmission. Some exemplary chipsets may include a wireless fidelity (WiFi) chipset 1302, a Bluetooth® chipset 1304, a Long-Range (LoRa) chipset 1306, or any other suitable chipset for providing wireless communication.

As noted elsewhere, the interface device may include a power source (e.g., power source 208 as described in relation to FIG. 2 above). Such a power source may include at least a battery pack 1308, a power management module 1310, and one or more power control circuits 1312. In some embodiments, the interface device may include a bus power circuit 1314 configured to siphon some amount of power from the access control system via an external connector 1300 electrically connected to the access control system.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. An electronic device comprising:
   one or more processors;
   memory;
   a wireless transceiver;
   bus transmission circuitry including
      a first transistor,
      a first input line electrically connected to a third terminal of the first transistor,
      a first bus connection line electrically connected to a second terminal of the first transistor,
      a second bus connection line electrically connected to a first terminal of the first transistor,
      a capacitor,
      a second input line electrically connected to the capacitor,
      a first switch electrically connected to the capacitor and to the first bus connection line, the first switch being transitionable between a closed state in which the capacitor is electrically connected to the first bus connection line through the first switch, and an open state, and
      a third input line electrically connected to the switch.

2. The electronic device of claim 1, wherein
   the first transistor comprises an N-channel metal oxide semiconductor field effect transistor,
   the third terminal of the first transistor comprises a gate terminal,
   the second terminal of the first transistor comprises a drain terminal,
   the first terminal of the first transistor comprises a source terminal,
   the capacitor comprises a polarized capacitor, and
   the first switch comprises a solid state relay.

3. The electronic device of claim 1, wherein the first input line is electrically connected to an output terminal of an operational amplifier.

4. The electronic device of claim 1, wherein the first input line is electrically connected to a comparator.

5. The electronic device of claim 1, wherein the second input line is electrically connected to a driver, and wherein a fourth input line is electrically connected to the driver.

6. The electronic device of claim 1, wherein the electronic device comprises a controller.

7. The electronic device of claim 1, wherein the electronic device comprises
   a digital potentiometer;
   a fourth input line electrically connected to the digital potentiometer;
   a power line electrically connected to the digital potentiometer;
   a fifth input line;
   an operational amplifier;
   wherein the fifth input line is electrically connected to a first input terminal of the operational amplifier;
   wherein a connection line connects an output terminal of the digital potentiometer to a second input terminal of the operational amplifier;
   wherein the first input line is electrically connected to an output terminal of the operational amplifier.

8. The electronic device of claim 1, wherein the electronic device comprises bus receiving circuitry including
   a fourth input line electrically connected to the first bus connection line,
   a coupling relay,
   an attenuator,
   an amplifier,
   a second switch and a third switch, the second switch and the third switch being transitionable together between
      a first state in which the fourth input line is electrically connected to the amplifier through the coupling relay, and
      a second state in which the fourth input line is electrically connected to the amplifier through the attenuator,
   a comparator electrically connected to the amplifier,
   a fifth input line electrically connected to the comparator,
   one or more amplitude shift keying demodulator components electrically connected to the comparator,
   one or more frequency shift keying demodulator components electrically connected to the comparator,
   a first output line electrically connected to the comparator
   a second output line electrically connected to the one or more amplitude shift keying components; and
   a third output line electrically connected to the one or more frequency shift keying components.

9. The electronic device of claim 1, wherein the electronic device comprises one or more electronically-readable media storing instructions that, when executed by the one or more processors, cause the electronic device to
   receive first data using the wireless transceiver,
   store, based on the first data, first configuration settings associated with a first model of intercom system,
   receive second data using the wireless transceiver,
   send, over the first bus connection line, a first signal generated using the first input line and the first transistor based on the second data and the first configuration settings associated with the first model of intercom system,
   receive third data using the wireless transceiver,
   store, based on the third data, second configuration settings associated with a second model of intercom system,
   receive fourth data using the wireless transceiver,
   send, over the first bus connection line, a second signal generated using the second input line and the switch based on the fourth data and the second configuration settings associated with the second model of intercom system.

10. An electronic device comprising:
bus transmission circuitry including
a first transistor electrically connected to a first input line, a first bus connection line, and a second bus connection line,
a switch electrically connected to the first bus connection line, and
a second input line electrically connected to the switch, the switch being transitionable between a closed state in which the second input line is electrically connected to the first bus connection line through the first switch, and an open state;
a network interface;
one or more processors; and
one or more electronically-readable media storing instructions that, when executed by the one or more processors, cause the electronic device to
receive first data using the network interface,
store, based on the first data, first configuration settings associated with a first model of intercom system,
receive second data using the network interface,
send, over the first bus connection line, a first signal generated using the first input line and the first transistor based on the second data and the first configuration settings associated with the first model of intercom system,
receive third data using the network interface,
store, based on the third data, second configuration settings associated with a second model of intercom system,
receive fourth data using the network interface,
send, over the first bus connection line, a second signal generated using the second input line and the switch based on the fourth data and the second configuration settings associated with the second model of intercom system.

11. The electronic device of claim 10, wherein the one or more electronically-readable media store instructions that, when executed by the one or more processors, cause the electronic device to couple a signal from the second input line on top of the first bus connection line.

12. The electronic device of claim 10, wherein the switch comprises an opto-coupler relay, the opto-coupler relay comprising a light emitting diode and one or more photo sensors.

13. The electronic device of claim 10, wherein the switch comprises a solid-state relay.

14. The electronic device of claim 10, wherein the transistor comprises an N-channel metal oxide semiconductor field effect transistor.

15. The electronic device of claim 10, wherein the one or more electronically-readable media store instructions that, when executed by the one or more processors, cause the electronic device to send over the first bus connection line, in response to receiving the second data using the network interface, the first signal based on
sending a third signal over the first input line, the third signal over the first input line causing the transistor to electrically connect the first bus connection line to the second bus connection line for a first period of time,
sending a fourth signal over the first input line, the fourth signal over the first input line causing the transistor to electrically connect the first bus connection line to the second bus connection line for a second period of time.

16. The electronic device of claim 10, wherein the electronic device comprises a digital potentiometer, and wherein the one or more electronically-readable media store instructions that, when executed by the one or more processors, cause the electronic device to transmit over the first bus connection line, in response to receiving the second data using the network interface, the first signal based on
sending a third signal over a third input line, the third signal over the third input line causing the digital potentiometer to adjust a resistance of the digital potentiometer to a first resistance value,
transmitting a fourth signal over a fourth input line, the fourth signal over the first input line causing the transistor to electrically connect the first bus connection line to the second bus connection line for a first period of time,
transmitting a fifth signal over the third input line, the fifth signal over the third input line causing the digital potentiometer to adjust a resistance of the digital potentiometer to a second resistance value that is different than the first resistance value, and
transmitting a sixth signal over the fourth input line, the sixth signal over the fourth input line causing the transistor to electrically connect the first bus connection line to the second bus connection line for a second period of time.

17. The electronic device of claim 10, wherein the electronic device comprises receiving circuitry including a first receiving switch, attenuator circuitry, comparator circuitry, and coupling relay circuitry, and wherein the one or more electronically-readable media store instructions that, when executed by the one or more processors, cause the electronic device to
generate fifth data using the first receiving switch, the attenuator circuitry, and the comparator circuitry based on
a third signal received over the first bus connection line, and
the first configuration settings associated with the first model of intercom access control device.

18. The electronic device of claim 17, wherein the electronic device comprises receiving circuitry including a first receiving switch, attenuator circuitry, comparator circuitry, and coupling relay circuitry, and wherein the one or more electronically-readable media store instructions that, when executed by the one or more processors, cause the electronic device to
generate fifth data using the first receiving switch, the attenuator circuitry, and the comparator circuitry based on
a third signal received over the first bus connection line, and
the second configuration settings associated with the second model of intercom access control device.

19. The electronic device of claim 18, wherein the one or more electronically-readable media store instructions that, when executed by the one or more processors, cause the electronic device to
generate sixth data using the first receiving switch, the coupling relay circuitry, and the comparator circuitry based on
a fourth signal received over the first bus connection line, and
the first configuration settings associated with the first model of intercom access control device.

20. The electronic device of claim 17, wherein the one or more electronically-readable media store instructions that, when executed by the one or more processors, cause the electronic device to generate sixth data using the first receiving switch, the coupling relay circuitry, and the comparator circuitry based on
- a fourth signal received over the first bus connection line, and
- the second configuration settings associated with the second model of intercom access control device.

21. The electronic device of claim 10, wherein the electronic device comprises receiving circuitry including a frequency shift keying (FSK) demodulator component and an amplitude shift keying (ASK) demodulator component.

22. The electronic device of claim 21, wherein the first configuration settings or the second configuration settings indicate a center frequency for use by the ASK demodulator component.

23. The electronic device of claim 10, wherein the electronic device comprises a controller.

24. The electronic device of claim 10, wherein the electronic device comprises inter-integrated circuit lines, and wherein the one or more electronically-readable media store instructions that, when executed by the one or more processors, cause the electronic device to send, based on the first configuration settings, a third signal over the first input line electrically connected to the transistor, the first input line being one of the inter-integrated circuit lines, and the third signal causing the transistor to electrically connect the first bus connection line to the second bus connection line.

25. The electronic device of claim 10, wherein the electronic device comprises inter-integrated circuit lines, and wherein the one or more electronically-readable media store instructions that, when executed by the one or more processors, cause the electronic device to transmit, based on the first configuration settings, a third signal over a third input line electrically connected to a digital potentiometer, the third input line being one of the inter-integrated circuit lines, and the third signal causing the digital potentiometer to adjust a resistance of the digital potentiometer; and transmit, based on the first configuration settings, a fourth signal over the first input line electrically connected to the transistor, the first input line being one of the inter-integrated circuit lines, and the fourth signal causing the transistor to electrically connect the first bus connection line to the second bus connection line.

* * * * *